United States Patent

Endo et al.

[11] Patent Number: 5,106,681
[45] Date of Patent: * Apr. 21, 1992

[54] POLYESTER FILMS, MAGNETIC RECORDING MEDIA AND FILM CAPACITORS PRODUCED THEREFROM

[75] Inventors: Kazuo Endo; Nobuyasu Shudo, both of Yokohama; Chikakazu Kawaguchi, Atsugi; Yoshio Meguro, Tokyo; Masahiko Fujimoto, Yokohama; Toshifumi Takisawa, Tokyo; Masashi Inagaki, Machida, all of Japan

[73] Assignee: Diafoil Company, Limited, Tokyo, Japan

[*] Notice: The portion of the term of this patent subsequent to Feb. 5, 2008 has been disclaimed.

[21] Appl. No.: 420,474

[22] Filed: Oct. 12, 1989

Related U.S. Application Data

[62] Division of Ser. No. 155,512, Feb. 12, 1988, abandoned.

[30] Foreign Application Priority Data

| | | | |
|---|---|---|---|
| Feb. 12, 1987 | [JP] | Japan | 62-30393 |
| Apr. 3, 1987 | [JP] | Japan | 62-82481 |
| May 22, 1987 | [JP] | Japan | 62-125056 |
| Jun. 11, 1987 | [JP] | Japan | 62-145752 |
| Jun. 12, 1987 | [JP] | Japan | 62-146302 |
| Jun. 18, 1987 | [JP] | Japan | 62-152222 |
| Jun. 18, 1987 | [JP] | Japan | 62-152223 |
| Jun. 19, 1987 | [JP] | Japan | 62-152570 |
| Jun. 22, 1987 | [JP] | Japan | 62-155174 |
| Jun. 23, 1987 | [JP] | Japan | 62-156214 |

[51] Int. Cl.$^5$ .......................................... G11B 23/00
[52] U.S. Cl. .................................. 428/323; 428/331; 428/480; 428/694; 428/900
[58] Field of Search ............... 428/331, 323, 329, 694, 428/900, 480

[56] References Cited

U.S. PATENT DOCUMENTS

| | | | |
|---|---|---|---|
| 3,968,183 | 7/1976 | Hayashi et al. | 260/860 |
| 4,348,446 | 9/1982 | Mitsuishi et al. | 428/694 |
| 4,375,494 | 3/1983 | Stokes . | |
| 4,461,797 | 7/1984 | Adachi et al. | 428/900 |
| 4,670,319 | 6/1987 | Katoh et al. | 428/694 |
| 4,677,188 | 6/1987 | Utsumi et al. . | |
| 4,680,217 | 7/1987 | Kanesaki et al. | 428/694 |
| 4,693,932 | 9/1987 | Kuze et al. | 428/323 |
| 4,818,581 | 4/1989 | Katoh et al. | 428/694 |

FOREIGN PATENT DOCUMENTS

| | | |
|---|---|---|
| 257611 | 3/1988 | European Pat. Off. . |
| 61-31429 | 2/1986 | Japan . |

OTHER PUBLICATIONS

Journal of Colloid and Interface Science 26, 62-69 (1968) "Controlled Growth of Monodisperse Silica Spheres in the Micron Size Range", Stoeber, Fink & Bohn.

Primary Examiner—Paul J. Thibodeau
Attorney, Agent, or Firm—Oblon, Spivak, McClelland, Maier & Neustadt

[57] ABSTRACT

Disclosed herein is a polyester film containing specific fine spherical silica particles. The film of the present invention is especially suitable as a base film for a magnetic recording medium or dielectric for a capacitor. The films of the present invention have the markedly improved properties such as surface properties, electromagnetic properties, electrical properties, etc. due to the excellent dispersibility of the particles in the film.

10 Claims, 2 Drawing Sheets

N₂ gas

POLYESTER FILMS, MAGNETIC RECORDING MEDIA AND FILM CAPACITORS PRODUCED THEREFROM

This is a division of application of Ser. No. 07/155,512, filed Feb. 12, 1988 now abandoned.

BACKGROUND OF THE INVENTION

The present invention relates to polyester films and magnetic recording media and film capacitors produced therefrom. More particularly, the present invention relates to polyester films containing particular silica particles, which is excellent in various properties, and the above products obtained from such polyester films.

Polyester films, especially biaxially stretched polyester films such as polyethylene terephthalate films have excellent physical, chemical and thermal properties and are widely used as fibers, films and other molded articles.

A film property which is generally desired in the production of these films and in handling of the produced films is good slipperiness between the films themselves or between the film and other base material. Poor slipperiness of film in the production process or the steps of after-treatments such as coating and deposition or in handling of the product itself may lead to bad workability and reduced commercial value of the products.

For improving slipping properties of film, it has been generally practised to add fine particles into polyester to provide proper unevenness to the film surface.

As the fine particles used for such purpose, the particles of inorganic compounds inert to polyester such as talc, kaolin, silica, calcium carbonate, titanium dioxide, graphite, carbon black and the like have been employed. However, these inorganic compound particles, which are usually obtained by crushing natural minerals or by syntheses, are difficult to avoid the presence of coarse particles or agglomerates of particles.

If coarse particles are contained in polyester or dispersibility of particles is poor there tends to take place clogging of the filter in the extrusion step or a break of the film. Also, a defect such as fish-eye would be produced in the film, giving rise to the problems such as drop out in magnetic tapes or reduced dielectric strength in capacitors, etc.

Particularly in the field of magnetic tapes, requests for the reduction of size, longer play time and higher image quality are rising. For the attainment thereof, it is necessary to make the unevenness on the film surface more uniform and finer.

To this purpose, it has been proposed to remove coarse particles, before use, from the inert inorganic particles by crushing and classifying the particles. For example, a method is known in which a powder obtained by crushing starting mineral material or a powder obtained from a synthesis is subjected to a dry or wet crushing treatment and then to a dry or wet classifying treatment. This method, however, although capable of removing coarse particles to a certain extent, was still unsatisfactory.

Various types of silica particles differing in average diameter are commercially available. However, when films were made by incorporating such silica particles into polyester, the produced films would fail to meet said strict property requirements.

Generally, the finely divided particles having a relatively high surface activity such as silica particles tend to form agglomerate particles and can hardly be dispersed thoroughly in the disperse medium. Also, agglomeration of particles accelerates in the course of preparation of polyester after addition of the fine particles and, as a result, the coarse agglomerate particles are formed in polyester to make the unevenness on the film surface ununiform, resulting in a reduced commercial value of the produced film. Especially in case such film is used as support for magnetic tapes such as deposited tapes or metal tapes, a decrease of output or an increase of drop out of signals would be caused.

As a result of assiduous studies on dispersibility and possibility of forming coarse agglomerate particles of silica particles in the particle addition method, particularly in the method using silica particles as the particles to be added, the present inventors found that the amorphous fine spherical silica particles obtained by subjecting alkoxysilane to hydrolysis and a condensation reaction by using a specific catalyst have a very narrow particle size distribution, contain no coarse particles, have excellent dispersibility in media such as ethylene glycol and in polyester, and as a result, a polyester film containing such amorphous fine spherical silica particles has a fine and uniform surface roughness with minimized coarse protuberances and also having excellent flatness and slip characteristics. The present invention was attained on the basis of such finding.

BRIEF DESCRIPTION OF THE DRAWINGS

Each of the numbers 1 to 7 respectively indicates as follows.
1: DC high voltage generator and ammeter
2: stainless steel bars directly connected to electrodes (5)
3: rubber stopper
4: Teflon tubes for preventing electrical leak from other parts than electrodes (5)
5: electrodes (made of stainless steel)
6: Teflon block with bores for fixing electrodes therein
7: molten composition

DETAILED DESCRIPTION OF THE INVENTION

Figure 1:
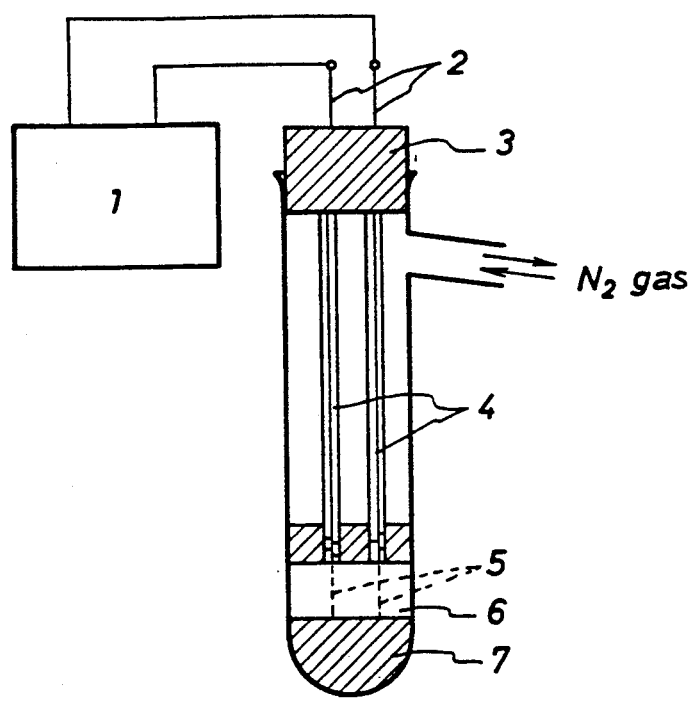
FIG. 1 is a schematic illustration of the apparatus for measuring the melt specific resistance.

The present invention relates a polyester film, magnetic recording film and film capacitor produced therefrom. The polyester film contains 0.001 to 5% by weight of fine spherical silica particles obtained by subjecting alkoxysilane to hydrolysis and a condensation reaction, said particles being substantially amorphous and having an average diameter of 0.01 to 3.0 $\mu$m, and the diameter dispersion index of said particles represented by the formula (1) being in the range of 1.1 to 2.7:

$$d_{90}/d_{10} \quad (1)$$

wherein $d_{10}$ is the diameter of the particle when the cumulative number thereof is 10% of the total number of said particles, $d_{90}$ is the diameter of the particle when the cumulative number thereof is 90% of the total number of said particles, and $d_{10}$ and $d_{90}$ are measured under an electron microscope, said cumulative numbers being calculated beginning with the largest particle size.

The polyester used in the present invention includes polyesters which is obtained by using aromatic dicarboxylic acids such as terephthalic acid, naphthalene-2,6-dicarboxylic acid, etc., or esters thereof and ethylene glycol as main starting materials. These polyesters may contain other material(s) as third constitutional component. As the third constitutional component, there can be used, for example, isophthalic acid as aromatic dicarboxylic acid component, and propylene glycol, tetramethylene glycol, diethylene glycol, neopentylene glycol, cyclohexane dimethanol and the like either singly or in combination as glycol component. Polyalkylene glycol and the like are also usable. In any event, the polyester used in the present invention is preferably the one in which 80% by mole or more of the constitutional repeating units are constituted by ethylene terephthalate units or ethylene-2,6-naphthalate units.

It has been considered that generally polyesters comprising ethylene-2,6-naphthalate units as main repeating units are poor in particle dispersibility as compared with polyethylene terephthalate, but the fine spherical silica particles according to the present invention exhibit excellent dispersibility in such polyesters.

In the present invention, the particles added to be contained in polyester for improving the surface flatness and slipping properties of the produced film are the fine spherical silica particles having an average diameter of 0.01 to 3.0 $\mu$m. The fine spherical silica particles used in the present invention can be obtained by subjecting the starting material alkoxysilane to hydrolysis and a condensation reaction by using an amine type catalyst.

The alkoxysilane used as starting material for the preparation of the fine spherical silica particles may be selected from the alkoxysilane compounds represented by the formula $(C_nH_{2n+1}O)_4Si$ (wherein n is an integer of 1 to 8), the preferred examples thereof being tetramethoxysilane, tetraethoxysilane, tetrapropoxysilane, tetrabutoxysilane and the like. As the catalyst for the hydrolysis and condensation reactions, there can be used ammonia, trimethylamine, tetraethylammonium salt aqueous solution, urea and the like, but an aqueous solution of ammonia is preferred.

The fine spherical silica particles of the present invention can be synthesized, for instance, in the following way. A solution is prepared by dissolving tetramethoxysilane in an alcohol such as methanol (solution A). There is also separately prepared a solution by dissolving water and an aqueous ammonia solution in methanol (solution B). Both solutions are maintained at a predetermined temperature, for example, 20-30° C. Solution A is added to solution B under vigorous stirring and the mixture is maintained at a predetermined temperature for several hours, then centrifuged, washed with the solvent alcohol, dried and dispersed in ethylene glycol. It is also possible to employ a method in which ethylene glycol is added to a suspension of fine spherical silica particles obtained after the prescribed reactions, and the mixture is subjected to distillation to remove excess ammonia, alcohol and water.

In either case, it is preferable that the fine spherical silica particles of the present invention be ultimately prepared as a slurry in ethylene glycol.

The concentration of thus prepared fine spherical silica particles in ethylene glycol is preferably not higher than 20% by weight, more preferably not higher than 10% by weight, particularly preferably not higher than 5% by weight but not less than 0.5% by weight. If the concentration of the silica particles exceeds 20% by weight, there may take place agglomeration of particles when they are added in the course of the polycondensation reaction. On the other hand, if the particle concentration is less than 0.5% by weight, the amount of ethylene glycol used becomes excess, resulting in a poor economy.

The characteristic features of the fine silica particles according to the present invention obtained from the hydrolysis and condensation reactions of alkoxysilane are that these particles are spherical in shape and extremely uniform in size. As a measure for evaluating the particle size distribution of the fine spherical silica particles of the present invention, the particle size distribution of the particles was determined by electron microphotograph and the numbers of the particles having the respective sizes (diameters) were cumulated beginning with the largest particle size, and the diameters of the particles when the cumulative numbers thereof are 10% and 90% were represented by $d_{10}$ and $d_{90}$, respectively. In the present invention, the value of $d_{10}/d_{90}$ is preferably in the range of 1.1 to 2.7, more preferably 1.1 to 2.5, particularly preferably 1.1 to 2.3 A $d_{10}/d_{90}$ value of greater than 2.7 signifies a too broad particle size distribution, in which case the control of film surface roughness becomes difficult or the course particles increase in number.

It is actually very difficult to obtain the particles whose $d_{10}/d_{90}$ value is less than 1.1 on an industrial scale.

The fine spherical silica particles used in the present invention are preferably 0.01 to 3.0 $\mu$m in diameter. If the diameter of these particles is less than 0.01 $\mu$m, there can be obtained no satisfactory improvement of surface flatness and slipping properties of the film. If the diameter of the particles exceeds 3.0 $\mu$m, the produced film will prove too large in surface roughness or poor in quality due to the presence of the particles with large diameters.

The fine spherical silica particles of the present invention preferably comprises 90% by weight or more of silicon dioxide and it is preferable that the volumetric shape parameter ($\phi v$) thereof satisfies the following formula (2):

$$0.4 \leq \phi v \leq 6/\pi \quad (2)$$

wherein $\phi v$ is defined as $\phi v = V/D^3$, V is the volume of particle ($\mu m^3$) and D is maximum diameter ($\mu m$) of the particles in the projection plane.

It is also desirable that the fine spherical silica particles of the present invention has a specific surface area ratio (R), defined by the formula (3), of 5.0 or greater, preferably 10 to 100:

$$R = \frac{\text{specific surface area determined by BET method}}{\text{specific surface area calculated based on equivalent spheres}} \quad (3)$$

The "specific surface area ratio" indicates the degree of porosity of the silica particles. When the value of this ratio is less than 5, the particle is poor in affinity for polyester and also unsatisfactory in improving wear resintance of the produced film. Also, when the ratio exceeds 100, the interaction between the particles increases to encourage agglomeration of the particles, which reduces the performance of slurry filter and gives rise to coarse protuberances on the film surface.

In the present invention, the content of the fine spherical silica particles in the polyester film should be 0.001 to 5% by weight based on polyester. When the particle content is less than 0.001% by weight, there can be obtained no satisfactory effect of improving slipping properties and wear resistance of the produced film, and when the particle content exceeds 5% by weight, the produced film has too high surface roughness and also the agglomerates of particles and coarse protuberances increase.

The fine spherical silica particles used in the present invention have a very narrow particle size distribution and excellent dispersibility in ethylene glycol, so that no specific dispersing or classifying treatment is necessitated and also have very good filtrability through slurry filter.

In the preparation of the polyester film of the present invention, the fine spherical silica particles are preferably added in the course of polyester synthesis reaction. For example, it is recommended to add the particles before ester exchange reaction, before esterification reation, during ester exchange or esterification reaction, or after the end of ester exchange or esterification reaction and before start of polycondensation reaction.

As the polycondensation reaction catalyst in the preparation of polyester, there can be used the ordinarily employed catalysts such as Sb, Ge, Ti, Sn and Mg compounds.

Other types of inactive particles may be preferably contained in polyester in combination with the fine spherical silica particles (A particles). This contributes to the improvement of wear resistance of the polyester film. This also improves the electromagnetic properties of the film especially when it is used for a magnetic tape.

The following two groups of particles (I and II) can be cited as typical examples of other types of inactive particles (B particles) usable in the present invention:

I: silica particles other than the fine spherical silica particles, calcium carbonate particles, amorphous zeolite particles, fine particles of anatase type titanium dioxide, calcium phosphate, kaolin, talc, clay and the like;

II: fine particles precipitated by the result of the reaction of phosphorus compound and residue of ester exchange catalyst in the polyester polycondensation reaction system, for example, fine particles comprising calcium, lithium and phosphorus compounds, fine particles comprising calcium and phosphorus compounds, and fine particles comprising calcium, magnesium and phosphorus compounds.

In case of using other types of inactive particles (B particles) in combination with A particles, the mixing ratio, etc., of A particles and B-I particles or B-II particles is preferably selected in accordance with the following conditions.

In the case of combined use of A particles and B-I particles, the ratio of diameter of B-I particles to diameter of A particles ($D_2/D_1$) is 1.1-3, preferably 1.5-2.0, and the amount of B-I particles used is 0.005 to 1.0% by weight, preferably 0.01 to 0.7% by weight, based on polyester.

If the $D_2/D_1$ ratio is less than 1.1, the improvement of wear resistance and winding property of the film made from the composition will be unsatisfactory. Also, if the $D_2/D_1$ ratio exceeds 3.0, the surface roughness of the film will become too large and also the amount of large particles in the film, which become a cause of drop out or other trouble, will increase to deteriorate the film quality.

If the content of B-I particles in polyester composition is less than 0.005% by weight, the film will not be improved to a satisfactory degree in wear resistance and winding property. If the content of B-I particles exceeds 1.0% by weight, there will result too large surface roughness of the film and an increased amount of large-sized particles which may cause drop out or other trouble, thus deteriorating the film quality.

The weight ratio of B-I particles to A particles is preferably in the range of 0.005 to 0.5, more preferably 0.01 to 0.1.

It is possible to use A particles themselves as B-I particles as far as the particle size and amount of these particles fall within the above-defined ranges.

In the combined use of A particles and B-II particles, the latter are used in an amount of 0.05 to 1.0% by weight, preferably 0.05 to 0.4% by weight, based on polyester. If the content of B-II particles is less than 0.05% by weight, the surface roughness of the film will become too low to provide the desired slipping properties. On the other hand, if the content of B-II particles is higher than 1.0% by weight, the film surface will become too rough, causing a deterioration of electromagnetic properties in use of the film as an electromagnetic recording medium. The diameter of B-II particles is usually about 0.1 to 3 μm.

Now, a preparation process of polyester containing precipitated particles especially suited for use in this invention will be described in detail.

The polyester mentioned above can be obtained, for example, by carrying out an ester exchange reaction in the presence of a lithium compound and a calcium compound, adding to the reaction product at least one compound selected from the group consisting of phosphoric acid, phosphorous acid or alkyl or allyl esters thereof in an amount of 0.6 to 3 times the total amount of said metallic compounds, and successively carrying out a polycondensation reaction.

Lithium compounds which can be dissolved in the esterification or ester exchange reaction product are usable in the ester exchange reaction. Examples of such lithium compounds are salts of aliphatic carboxylic acids such as acetic acid, propionic acid and butyric acid, salts of aromatic carboxylic acids such as benzoic acid and p-methylbenzoic acid, and lithium glycolates of ethylene glycol or propylene glycol. Among them, aliphatic lithium carboxylate, especially lithium acetate is preferred. The amount of such lithium compound to be added is preferably 0.03 to 0.4% by mole, more preferably 0.1 to 0.3% by mole, based on the aromatic dicarboxylic acid component for polyester.

As the calcium compounds usable in the ester exchange reaction, it is possible to use any of those calcium compounds which can be dissolved in the esterification or ester exchange reaction product. Examples of such calcium compounds are salts of aliphatic carboxylic acids such as acetic acid, propionic acid and butyric acid, salts of aromatic carboxylic acids such as benzoic acid and p-methylbenzoic acid, and calcium glycolates of ethylene glycol or propylene glycol. Among them, aliphatic calcium carboxylate, especially calcium acetate is preferred.

The amount of such calcium compound to be used in the ester exchange reaction is preferably 0.05 to 0.3% by mole, more preferably 0.08 to 0.15% by mole based on the aromatic dicarboxylic acid component for polyester.

As the phosphorus compound, there can be used any of those phosphorus compounds which are reacted with the metallic compounds and are partially or wholly converted into a phosphate or phosphite of the metal, but it is preferred to use phosphoric acid, trialkyl esters of phosphoric acid, partial alkyl esters of phosphoric acid, phosphorous acid, trialkyl esters of phosphorous acid, and partial alkyl esters of phosphorous acid.

Such phosphorus compound is added in an amount of 0.6 to 3 equivalents, preferably 0.8 to 2 equivalents, more preferably 0.9 to 1.5 equivalents to the total amount of the metallic compounds.

The equivalent ratio of phosphorus compound to metallic compounds is given by the following formula (4):

$$\frac{P}{Ca + \frac{1}{2} Li} \quad (4)$$

wherein P, Ca and Li represent the number of moles of phosphorus compound, calcium compound and lithium compound, respectively.

As described above, precipitated particles containing metallic elements and phosphorus element can be obtained by using the metallic compounds and phosphorus compounds in combination.

It is especially referable that each of calcium, lithium and phosphorus elements be contained in an amount of 1.0% by weight or more based on the precipitated particles. In this case, it is possible to form a great many of sharp and uniform fine protuberances on the film surface, which greatly contributes to the improvement of slip characteristics of the film.

Of course, a part or whole of lithium or calcium compound may be added after the ester exchange reaction has been completed.

In this invention, the particles containing lithium, calcium and phosphorus elements precipitated in polyester are used in an amount of 0.05 to 1.0% by weight, preferably 0.05 to 0.4% by weight, more preferably 0.06 to 0.18% by weight, based on the polyester film. In this case, the quantitative determination of the precipitated particles is made in the following way. Quantitative determination of precipitated particles in polyester film: 1.0 liter of o-chlorophenol is added to 100 g of polyester, and the mixture is heated at 120° C. for 3 hours and then centrifuged with Beckmann Ultracentrifuge L3-50 at 30,000 r.p.m. for 40 minutes, and the resulting particles are dried in va·;uo at 100° C. These particles are measured by a differential scanning calorimeter, and when a melt peak corresponding to polymer has appeared, the particles are added with o-chlorophenol, heated, then cooled and again centrifuged. When the melt peak due to polymer has disappeared, the weight of said particles is regarded as the weight of precipitated particles and the weight ratio to polyester is calculated.

In the present invention, in case of using B-I particles, it is preferable to regulate their Mohs hardness to 4.0 or below. If the Mohs hardness of the particles is higher than 4.0, the film and rolls could suffer from scratches when the film is rolled up or subjected to calendering after it has been coated with a magnetic layer.

The polyester film of the present invention can be obtained as a stretched polyester film according to a known method, for example, the method described in Japanese Patent Publication No. 30-5639(1955).

The polyester film of the present invention is very useful as base film for magnetic recording media such as magnetic tapes, floppy discs, etc., or as base film for various other types of commercial products such as condenser, photographic plate, electric insulator, thermosensitive transfer sheet, package, transfer mark, gold and silver threads, etc.

The polyester film of the present invention usually has an average surface roughness (Ra) of 0.003 to 0.20 $\mu$m and a thickness of 1 to 400 $\mu$m, particularly 1 to 200 $\mu$m.

Also, the polyester film of the present invention is excellent in wear resistance and rarely suffers from drop out as the film contains the specific fine spherical silica particles described above. These quality characteristics are particularly conspicuous in the film which satisfies the requirements expressed by the following formulae (5) and (6) at the same time:

$$\Sigma H_n \leqq 20, \ 7 \geqq n \geqq 3 \quad (5)$$

$$\frac{H_n}{H_{n+1}} \geqq 10, \ 7 \geqq n \geqq 3 \quad (6)$$

wherein $H_n$ is the number of interference fringes of n-th order (fringes,cm²) when the film surface was measured by double beam interference method.

The application of the polyester film of the present invention wil be described in detail.

Magnetic recording media having the polyester film of the present invention as the base film will be first described.

In use of the polyester film of the present invention as a magnetic recording medium, the starting polyester composition is preferably the one whose specific resistance ($\rho_v$) in the molten state is $1.0 \times 10^8 \Omega$-cm or below. If the specific resistance of the starting polyester composition when melted exceeds the above value, small dents or recesses are formed in the amorphous sheet made from the composition by an electrostatic cooling method, and when a biaxially stretched film is made therefrom, the thickness unevenness of the film increases to cause nonuniform coating when the film is coated with a magnetic layer, resulting in a deterioration of electro-magnetic transducing characteristics of the finally produced magnetic recording medium.

The specific resistance ($\rho_v$) of the starting polyester composition can be made $1.0 \times 10^8$ $\Omega$-cm or below by, for example, regulating the ratio of the phosphorus compound used as thermal stability improver to the alkaline earth metal compound used as ester exchange catalyst (P/Me) to 1.4 or below in equivalent ratio, or by adding an alkaline metal compound after the end of ester exchange reaction or in the early or middle stage of polymerization reaction.

As the magnetic recording media, a film in which average refractive index $\bar{n}$ and refractive index in thicknesswise direction $n_\alpha$ is in the ranges defined by the following formulae (7) and (8) respectively is preferred:

$$1.600 \leq \bar{n} \leq 1.606 \tag{7}$$

$$n_\alpha \geq 1.492 \tag{8}$$

wherein the average refractive index is employed as an index for crystallization degree of the film, and the refractive index in thicknesswise direction is employed as an index for the degree of facial orientation of the film.

When the average refractive index exceeds 1.606, the film is lowered in strength due to too high degree of crystallization and lowered in wear resistance, and when the average refractive index is less than 1.600, the dimensional stability of the film at high temperatures is lowered, causing a deterioration of skew characteristics, etc., of the magnetic tape produced from the film.

On the other hand, when the refractive index in thicknesswise direction is less than 1.492, the film is incapable of producing a satisfactory effect of improving slip characteristics and wear resistance.

Such a film can be obtained, for example, by successively biaxially stretching method in which the longitudinal stretching temperature is set at about 105°–115° C. which is 5° to 30° C. higher than the ordinary stretching temperature.

Generally, magnetic recording media can be roughly classified into two types:- magnetic tapes and magnetic discs. The thickness of base film used for the former is usually 4 to 30 µm and that used for the latter is usually 30 to 100 µm.

An important mechanical property required for the magnetic recording media is that the $F_5$ value of the film in its machine direction is not less than 12 kg/mm$^2$, preferably not less than 16 kg/mm$^2$. The film with an $F_5$ value of less than 12 kg/mm$^2$ is relatively limited in bowing capacity even when using the particles other than the fine spherical silica particles of the present invention, and the advantageous properties of the fine spherical silica particles can not be put to best use.

The $F_5$ value indicates the stress (kg/mm$^2$) at 5% elongation of the film.

In the case of a film with high strength such as polyethylene-2,6-naphthalate film, the $F_5$ value in the machine direction is preferably 20 kg/mm$^2$ or greater, more preferably 28 kg/mm$^2$ or greater.

The effect of the present invention is maximized when the $F_5$ value in the machine direction of the film ($F_{5MD}$) and the $F_5$ value in the transverse direction ($F_{5TD}$) are defined by the following formula (9), especially by the formula (10):

$$3.0 > F_{5TD}/F_{5MD} > 1.1 \tag{9}$$

$$2.5 > F_{5TD}/F_{5MD} > 1.6 \tag{10}$$

The conventional high-strength films falling in the above range of $F_5$ value had the problems such as anisotropy of physical properties in the widthwise direction or affinity of particles and polyester, but the present invention has made it possible to solve these problems by use of the fine spherical silica particles.

Known film forming methods can be employed for making $F_5$ value in the machine direction 12 kg/mm$^2$ or greater. For example, it can be achieved by a method in which polyester chips are melt extruded into a film at 270°–300° C., then cooled to 40–70° C. and solidified to form an amorphous sheet, and this sheet is then biaxially stretched in the machine and transverse directions successively or simultaneously, followed by 1.05- to 2.0-fold restretching in the machine direction at 110°–180° C., and then heat treated at 160°–240° C. In this case, it is possible to properly incorporate such treatments as heat setting before restretching in the machine direction, relaxing in the machine direction before restretching, slight-degree stretching in the machine direction before or after restretching, etc. In the case of polyethylene-2,6-naphthalate, it is possible to obtain a film having an $F_5$ value of 20 kg/mm$^2$ or greater in the machine direction by using the same techniques except that the different stretching temperatures are used. For instance, a substantially non-oriented unstretched sheet of polyethylene-2,6-naphthalate which has been melt extruded and then cooled and solidified is biaxially stretched in the machine and transverse directions successively or simultaneously and then restretched 1.05 to 4.0 times in the machine direction at 140°–200° C., and the resulting film is heat treated at a temperature between 180° C. and 260° C. In this case, too, the techniques (heat setting before restreching, relaxing after restretching, slight-degree stretching in the machine direction before or after restretching, etc.) can be properly employed.

Concerning the physical properties of the magnetic recording media, it is preferable that the film has, in addition to the above characteristics, an average surface roughness (Ra), a double refractive index ($\Delta n$) and a number of broken protuberances (Bp) on the film surface defined by the following formulae (11), (12) and (13), respectively:

$$0.005 \leq Ra \leq 0.030 \ (\mu m) \tag{11}$$

$$\Delta n \leq 20 \times 10^{-3} \tag{12}$$

$$Bp \leq 10 \ (per \ mm^2) \tag{13}$$

When the average surface roughness is less than 0.005 µm, the film proves poor in workability, running property and wear resistance, while when it exceeds 0.030 µm, the magnetic recording medium made from the film is found poor in electro-magnetic transducing characteristics. The number of broken protuberances on the film surface is an indication of affinity of particles for polyester. The greater the number of broken protuberances, the less is the affinity. Bp (number of broken protuberances) of greater than 10/mm$^2$ indicates poor affinity of particles, and in this case, there takes place much deposition of powder on the calender rolls during calendering in the production process of magnetic recording medium, resulting in the deteriorated properties of the product. Wear resistance of the magnetic recording medium at the time of recording and reproduction is also lowered. When the double refractive index ($\Delta n$) exceeds $20 \times 10^{-3}$, the film has a large heat shrinkage and the magnetic recording medium made therefrom is lowered in skew characteristics at the time of reproduction, especially in use under high-temperature and high-humidity conditions.

Another preferable property is that the number of coarse protuberances of 0.81 µm or greater in height on the film surface is less than 10 per 25 cm$^2$, and the number of coarse protuberances of 0.54 to 0.81 μm is less than 50 per 25 cm². Especially, such property is an important requirement for the film to be used for magnetic discs. Such property can maintain the film handling characteristics good in the magnetic disc production process and can also enhance the electromagnetic characteristics of the produced magnetic disc.

It should be noted that the film having such property can be obtained only when using the fine spherical silica particles of the present invention which can give a uniform and fine film surface.

It is also pointed out as still another preferable property that the average surface roughness (Ra) (μm) of the film, and the ratio of maximum height of protuberance (Rt) (μm) of the film to Ra (Rt/Ra) fall within the ranges defined by the following formulae (14) and (15), respectively, and also the number of broken protuberances on the film surface is less than 20/mm²:

$$0.003 \leq Ra \leq 0.015 \quad (14)$$

$$5 \leq Rt/Ra \leq 20 \quad (15)$$

When Ra is less than 0.003 μm, the film is unsatisfactory in handling characteristics and wear resistance, and when Ra exceeds 0.015 μm, there can be obtained no satisfactory reproduction output as a high-density recording medium. The Rt/Ra ratio is a measure of uniformity of the height of protuberances. Generally, the smaller than Rt/Ra ratio, the better is the uniformity. However, when the Rt/Ra ratio is less than 5 although the uniformity of protuberance height is good, the shape of protuberance becomes broad and the reproduction output is rather lowered. When the Rt/Ra ratio exceeds 20, the protuberance height distribution becomes non-uniform and in this case, too, the reproduction output decreases. The values of Ra and Rt/Ra are based on average diameter of the particles contained, particle size distribution and particle content, but these values are also variable according to the base film producing conditions, that is, the stretching conditions of the polyester film made by a biaxial stretching method. In any case, the techniques employable in the present invention are not subject to any specific limitations as far as they meet the requirements of the present invention.

Magnetic recording media include tape for the audio, video computer use, and disc for the floppy use.

These magnetic recording media are usually produced by forming a magnetic layer on a polyester base film. As the method for producing magnetic recording media, application method and deposition method are known.

The magnetic recording media of the present invention may be preferably produced by the application method, i.e., by applying a composition comprising powdery magnetic material, binder resin, antistatic agent, abrasive, lubricant, dispersant, plasticizer, etc. on a polyester base film. As the binder resin, one or more of vinyl resin, cellulose resin, urethane resin, epoxy resin, phenoxy resin, etc. may be used. As the magnetic material, γ-iron (III) oxide, γ-iron (III) oxide doped with cobalt, chromium dioxide and a powder of iron metal may be used. A layer of undercoat may be formed prior to application of a magnetic composition on a polyester base film, if necessary.

The application of a magnetic composition is made according to doctor blade method or reverse roll method.

A magnetic recording media of tape obtained by application method is subjected to magnetic orientation, drying, curing and surface treatment, then slitted to give final products of a given width. In the case of a magnetic recording medium which has a magnetic layer only one side of a polyester base film as video tape, a back coating may be preferably provided in order to improve running property and abrasion resistance.

In the magnetic recording media produced by the application method, the thickness of magnetic layer is 1 to 10 μm, preferably 2 to 7 μm. And, it is preferable that 60 to 75 wt % of magnetic layer is powdery magnetic material and the majority of the rest is binder resin.

In the magnetic recording media produced by the deposition method, Fe-Co-Ni, Ni-Co-P, Fe-Ni, etc. are preferably used as the magnetic material and the thickness of magnetic layer is usually 0.1 to 0.5 μm.

The thickness of a polyester film used as a substrate for magnetic recording media is preferably 4 to 30 μm for magnetic recording tape and is preferably 30 to 100 μm for magnetic Next, the film capacitor produced by using the polyester film of the present invention as a dielectric will be described.

In case of using polyester film of the present invention for capacitors, the specific resistance of the starting polyester composition in the molten state is preferably adjusted to $2.0 \times 10^8$ Ω·cm or higher. In use of polyester film for capacitors, polyester film is required to satisfy some property requirements. One important property requirement is that the film has a specific "CR value" which is the product of electrostatic capacity and insulation resistance at normal and high temperature. The present inventors found that this property requirement can be met when the specific resistance of polyester composition in the molten state is maintained $2.0 \times 10^8$ Ω·cm or above.

Maintenance of specific resistance ($\rho_v$) at or above $2.0 \times 10^8$ Ω·cm can be achieved by regulating the ratio of the phosphorus compound used as thermal stability improver to the alkaline earth metal compound used as ester exchange catalyst (P/Me) to 1.2 or above, preferably 1.5 or above in equivalent ratio. Preferred examples of alkaline earth metal compounds usable here are calcium acetate, magnesium acetate, manganese acetate and the like. Phosphoric acid and phosphoric acid esters can be favorably used as phosphorus compound.

Also, in use of polyester film of the present invention for capacitors, it is preferable that the number of protuberances on film surface is not less than $1.0 \times 10^3$ per mm², and that the difference (Δd) between micrometric film thickness (measured by using 10 pieces of film) and gravimetric film thickness falls within the range defined by the following formula (16):

$$0.1 \leq \Delta d \leq 0.4 \quad (16)$$

When the number of protuberances on film surface is less than $1.0 \times 10^3$ per mm², slip characteristics of the film are bad and therefore film workability is poor.

Δd is a numerical indication of the degree of surface roughness (for the measuring method, see the section of Examples described below). When the value of Δd exceeds 0.4 the electrode gap in the produced capacitor becomes too large, causing a reduction of electric capacity. When Δd is less than 0.1, no satisfactory slip characteristics can be obtained and the workability is poor.

The polyester films having the above preferable properties can be obtained only when using the above-mentioned amorphous and fine spherical silica particles of the present invention which can give a uniform and fine film surface. Such polyester films can be produced according to the known methods, for example, the method described in Japanese Patent Publication No. 30-5639 (1955).

A film capacitor is produced by inserting a plastic film such as polyethylene terephthalate as a dielectric between electrodes. Film capacitors are classified into metal film capacitor having metal films of Al, Sn, etc. as electrodes thereof and metallized film capacitor having metallized films as electrodes obtained by metallizing Al, Sn, etc. on a plastic film. In the case of metal film capacitor, the thickness of metal film is 3 to 15 μm, preferably 5 to 10 μm and the thickness of polyester film as dielectric is preferably 3 to 30 μm. In the case of metallized film capacitor, the thickness of the metal layer metallized on a plastic film is preferably 0.01 to 0.2 μm and the thickness of polyester film as dielectric is preferably 0.5 to 10 μm.

Film capacitors are also classified into tub type (inductive winding type) and extend wheel type (noninductive winding type) base on the lead out manner of lead wires.

The polyester film of the present invention can be used in both capacitors of metal film capacitor and metallized film capacitor, however, can be preferably used in metallized film capacitor which is well suitable for miniaturization of capacitors.

Such metallized film capacitor is produced as follows. After a metallized film is slitted to a given width, for example 15 mm, two slitted metallized film is put together with the respective non-metallized portions situated on the opposite sides and is wound up together to be a capacitor element by using an element winder. The thus obtained capacitor element is pressed to be flat, then, both the end surfaces of the flat capacitor element are subjected to metallikon and soldering of lead wires, and finally, thus treated capacitor element is provided, if necessary, with an outer container to obtain a metallized film capacitor.

Although film capacitors are further classified into wound type capacitor described above and block type capacitor based on the configuration of element, it is a matter of course that the polyester film of the present invention can be also used as a dielectric for block capacitor.

The present invention will hereinafter be described in further detail by showing the examples thereof, but it is to be understood that these examples are merely intended to be illustrative and not limitative of the scope of the invention. The determination methods and definitions of various properties and characteristics shown in the Examples are as described below. All "parts" and "%" appearing in the following Examples are by weight unless otherwise noted.

(1) Average diameter and particle size distribution of fine spherical silica particles The particle diameter was measured by electron microphotographic method, and the particle size distribution was determined by measuring the diameters of about 1,000 pieces of particles and cumulating the numbers of the particles having the respective diameters beginning with the largest particle size. The diameter of the particles when the cumulative number thereof is 10% of the total number of particles was expressed as $d_{10}$ and the diameter of the particles when the cumulative number thereof is 90% of the total number of particles was expressed as $d_{90}$, and the degree of breadth of particle size distribution was indicated by the value of $d_{10}/d_{90}$ (diameter dispersion index).

Measurements of other additive particles were made by centrifugal precipitation method.

(2) Volumetric shape parameter of fine spherical silica particles

In the present invention, volumetric shape parameter ($\phi v$) is defined as $D/V^3$ wherein D is the maximum diamter (μm) of fine spherical silica particles as measured by electron microphotographic method and V is the measured volume (μm$^3$) of the particles.

(3) Specific surface area ratio (R) of fine spherical silica particles $$R = \frac{\text{specific surface area determined by BET method}}{\text{specific surface area calculated based on equivalent spheres}}$$

The specific surface area determined by BET method is the value determined from the adsorption of nitrogen gas at the temperature of liquid nitrogen.

(4) Intrinsic viscosity (n) of polyester composition 1 g of polyester composition was dissolved in 100 ml of a 50/50 (by weight) phenol/tetrachloroethane mixed solvent, and the viscosity of the solution was measured at 30° C.

(5) Particle dispersibility in film

It was determined by observing under a microscope the dispersed state of particles added in a biaxially stretched film.

(6) Specific resistance of polyester composition in the molten state 12 g of polyester composition was put into a test tube having N$_2$ in- or out-let and then dipped in an oil bath of 285° C. After the composition has been perfectly melted, air bubbles were completely removed by repeating evacuation and introduction of nitrogen gas. Then stainless steel electrodes were inserted into the test tube, and after maintaining them as it was for 10 min., a direct current of 3 kV was applied to the electrodes. Immediately after current application, the amperage was read and the specific resistance was calculated from the following formula:

$$\rho_v = \frac{3000}{I} \times \frac{S}{l} (\Omega\text{-cm})$$

Figure 2:
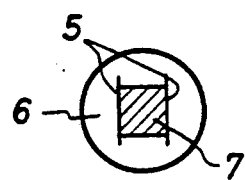
FIG. 2 is a bottom view of the portion indicated by 6 in FIG. 1.

In the above formula, $\rho_v$ is specific resistance (Ω-cm), I is amperage (A), S is sectional area (cm$^2$) of electrode, and l is distance (cm) between the electrodes. Schematic illustrations of the specific resistance measuring method are shown in FIGS. 1 and 2.

(7) Break frequency

The average break frequency (number of times of break) per 100,000 meters of film length was shown.

(8) Slip characteristics

The slip characteristics of film were indicated by coefficient of kinetic friction. The measurement was made by a method according to ASTMD-1894 modified to allow measurement with a tape sample. The measurement was conducted under an atmosphere of 23° C.±1° C. and 50±5% RH by using the samples of 15 m/m in width and 150 m/m in length, at a pulling rate of 20 mm/min.

(9) Coefficient of kinetic friction (μd) against metal

Figure 3:
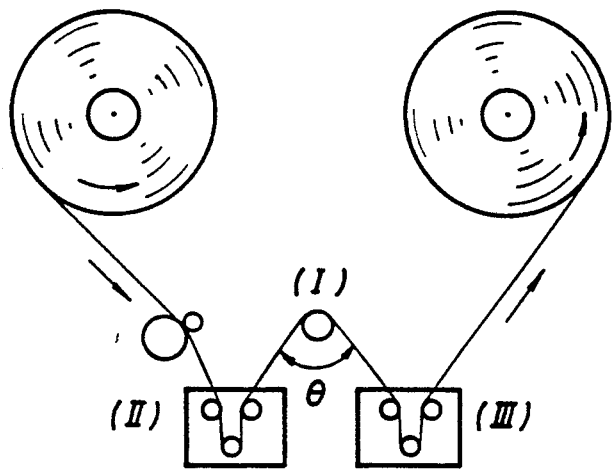
FIG. 3 illustrates a tape running system for evaluating the coefficient of kinetic friction against metals. (I): 6 m/m$\phi$ SUS-420-J2 fixed pin; (II): inlet tension meter; (III): outlet tension meter; $\theta = 135°$.

By using the apparatus shown in FIG. 3, a film was contacted with a fixed hard chrome-plated metal roll (6 mm in diameter) at a winding angle (θ) of 135°, and with a load ($T_2$) of 53 g applied to one end, the film was let run at a speed of 1 m/min. The resisting force ($T_1$ (g)) at the other end was measured, and the coefficient of friction (μd) in running of the film was determined from the following formula:

$$\mu d = \frac{1}{\theta} \ln \left(\frac{T_1}{T_2}\right) = 0.424 \ln \left(\frac{T_1}{53}\right)$$

(10) Slipping properties

Two pieces of film were placed on a flat glass plate and a rubber plate was further placed thereon. Then a load was applied thereon so that the contacting pressure of two pieces of film against each other would become 2 g/cm². In this state, two pieces of film were let slide relative to each other at a speed of 20 mm/min and the frictional force was measured. The coefficient of friction at a point where the two pieces of film slided 5 mm relative to each other was assumed to be the coefficient of kinetic friction (μd), and it was ranked as follows:

| | |
|---|---|
| μd ≤ 0.50 | Good |
| 0.50 < μd ≤ 0.60 | Normal |
| 0.60 < μd | Bad |

(11) Surface roughness

Surface roughness was represented by the average center line surface roughness Ra (μm). Ra was determined in the following way by using a surface roughness meter (SE-3FK) made by Kosaka Kenkyusho Co., Ltd. From the film surface roughness curve (sectional curve of film a portion with a standard length L (2.5 mm) in the direction of center line was taken out. Expressing the roughness curve as Y=f(x) with the center line of the portion taken out representing the X asis and the direction vertical to the center line representing the Y asis, the value given from the following formula was presented as Ra (μm):

$$Ra = \frac{1}{L} \int_0^L |f(x)| dx$$

The radius of the end of the feeler was 2 μm, the load was 30 mg, and cut-off value was 80 μm. Ra shown here is the average of the measurements at total 10 points, 5 points in the machine direction and 5 points in the transverse direction.

(12) Maximum height of protuberance (Rt)

The maximum height of protuberance was expressed by the difference between the maximum value and the minimum value of the sectional curve of film obtained in the determination of surface roughness described in the preceeding section. Rt shown here is the average of the measurements at total 10 points as in the case of Ra.

(13) Number of coarse protuberances

The film surface was deposited with aluminum and examined with a double beam interference microscope. The protuberances showing the 2nd order interference fringes at a measuring wavelength of 0.54 μm ($H_2$) were supposed to have a height of 0.54 to less than 0.81 μm, and the protuberances showing interference fringes of 3rd and higher orders ($H_3$) were supposed to have a height of 0.81 μm or greater. The number of these protuberances was counted per 25 cm².

(14) Number of surface protuberances

The number of protuberances per 0.1 mm² was counted from light microphotographs of film surface and converted to the number per 1 mm².

(15) Degree of surface roughness, Δd (Micrometric film thickness measured with 10 pieces of film placed one on another is indicated by $d_{10}$)

The thickness of a pile of 10 pieces of film was measured by using a 1/1000 micrometer with a measuring force of 700±100 gf and a measuring length of 0–25 mm according to JIS B-7502, and the obtained value was divided by 10 to give the $d_{10}$ value (μm).

(Gravimetric film thickness is indicated by $d_W$)

A 10 cm square piece was cut out from the film and its weight W was measured by Mettler electron balance, and $d_W$ was determined from the following formula:

$$d_W = W/1.4 \times 10^2 \text{ (μm)}$$

Δd was defined as follows:

$$\Delta d = d_{10} - d_W \text{ (μm)}$$

(16) Average refractive index, refractive index in the thicknesswise direction and double refractive index Measurement was made on sodium D line at 23° C. by using Abbe's refractometer. Average refractive index $\bar{n}$ is given by the following equation:

$$\bar{n} = \frac{1}{3}(n_\alpha + n_\beta + n_\gamma)$$

wherein $n_\alpha$ is refractive index in the thicknesswise direction, $n_\gamma$ is refractive index in the direction of main orientation, and $n_\beta$ is refractive index in the direction orthogonal to the main orientation direction.

Double refractive index is given by the following equation:

$$\Delta n = n_\gamma - n_\beta$$

(17) $F_5$ value

The $F_5$ value was determined from the stress at 5% elongation under an atmosphere of 23° C. and 50% RH by using Tensilon UTM-IV L made by Toyo Bauldwin Co., Ltd., under the following conditions:
Specimen shape: strip film (15 cm long and 1 cm wide)
Chack interval: 50 mm
Pulling rate: 100%/min

(18) Evaluation of winding characteristics

The appearance of the surface and the winding surface of the rolled film observed after rolling up the film was evaluated as follows:
(a) Surface was subatantially free of winkles and lumpy defects and had a uniform winding surface—o
(b) Surface was almost free of wrinkles but had some lumpy defects and was also slightly ununiform at winding surface—Δ
(c) Surface had wrinkles and lumpy defects and/or was excessively ununiform at winding surface—x.

(19) Number of broken protuberances

The gold-deposited film surface was photographed at 2,000 magnifications by a scanning electron microscope, and the number of the depressions or dents made after vanishment of protuberances supposed to be formed by particles was counted and converted to the number per unit surface area. The smaller the number, the better.

(20) Wear resistance

Figure 4:
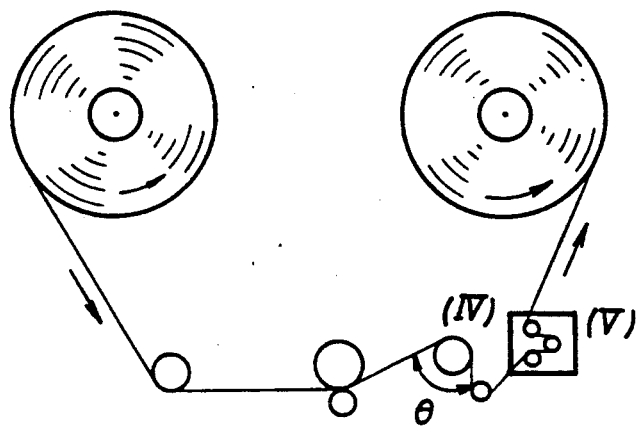
FIG. 4 illustrates a tape running system for evaluating wear resistance. (IV): 6 m/m$\phi$ SUS-420-J2 fixed pin; (V): tension meter; $\theta = 135°$.

By using a film running system shown in FIG. 4, the film was let run through a distance of 1,000 meters, and the amount of worn-out white powder adhering to a 6 mmφ hard chrome-made fixed pin was visually observed and evaluated on the following criterion. Film speed was 10 m/min and film tension was about 200 g. The angle (θ) was 130° C.

Rank A: No white powder adhered to the pin.
Rank B: White powder adhered slightly.
Rank C: A small amount (greater than Rank B) of white powder adhered.
Rank D: White powder adhered heavily.

(21) Generation of white powder

The white powder adhering to the feed rolls in the stretched film winder was visually observed and evaluated according to the following criterion (o, Δ and x). Observation was made at a point when 50,000 meters of film has been wound up.

o: No white powder generated.
Δ: White powder generated in a small amount.
x: White powder generated in a large amount.

(22) Evaluation of fouling of calender

The degree of fouling on the roll surface contacting the base film was evaluated by using a 5-stage mini-supercalender. The 5-point calender used consisted of planished metal rolls and polyester type composite resin rolls. Calendering was conducted under the following conditions: roll temperature=85° C., linear pressure=250 kg/cm, tape running speed=80 m/min. A magnetic tape of 5000 m in length was let run 7 times repeatedly, and the amount of white powder adhering to the resin roll was visually observed and the degree of fouling of the roll was evaluated on the following basis:

o: There was seen almost no adhesion of white powder on the resin roll.
Δ: Slight adhesion of white powder on the roll was noted.
x: There was seen obvious adhesion of white powder on the roll.

(23) Resistance to scratching

Aluminum was vacuum deposited on the surface of a 15 μm thick polyester film to a thickness of 250±10 Å, and this film was slitted to a 35 mm width and applied on a movable carrier with the aluminum deposited side facing upwards. On this aluminum deposited side of the film was placed a test film of the same width with an end thereof fixed. By applying a load of 16 g/cm$^2$ on the test film, the movable carrier was moved at a speed of 20 mm/min, causing the aluminum deposited face and the test film to move sliding relative to each other along a distance of 50–60 mm. The amount of scratches given to the aluminum deposited side of the film during this operation was measured and expressed by whole light transmittance (%) by using a haze meter NDH-20 D made by Nippon Denshoku Co., Ltd. The greater the amount of scratches, the higher is the whole light transmittance.

(24) Magnetic tape characteristics (characteristics of magnetic recording medium)

First, a magnetic coating material was prepared by mixing and dispersing 200 parts of fine magnetic powder, 30 parts of polyurethane resin, 10 parts of nitrocellulose, 10 parts of vinyl chloride-vinyl acetate copolymer, 5 parts of lecithin, 100 parts of cyclohexanone, 100 parts of methyl isobutyl ketone and 300 parts of methyl ethyl ketone in a ball mill for 48, hours and then further adding thereto 5 parts of polyisocyanate compound. This coating material was coated on a polyester film to form a magnetic layer so that the film thickness after drying would become 2 μm. Before the coating material has been sufficiently dried and solidified, the film was magnetically oriented and then dried. Then this coated film was subjected to a surface treatment by a supercalender and slitted to a ½ inch width to form a video tape. This video tape was set in NV-3700 Video Deck made by Matsushita Denki Co., Ltd., and operated at normal speed to evaluate the following magnetic tape characteristics.

(24-1) VTR head output

The VTR head output at a measuring frequency of 4 MHz was measured by a synchroscope and indicated by decibel (dB) as a relative value to that of the sample of Example 5 in Table 1 which was assumed to be 0.0 decibel (dB).

(24-2) Dropouts

A video tape which had recorded signals of 4.4 MHz was played back and dropouts were counted for about 20 minutes by a dropout counter made by Ohkura Industry Co., Ltd., and converted to the number of dropouts per minute.

(24-3) Skew

A video tape which had recorded chroma signal (reference signal of color) was played back and subjected to delayed sweep by Color Monitor CMM20-11 made by Shibasoku Co., Ltd. The quantity of distortion on the picture was read by a measure and converted to the horizontal scan time (μsec) by using the ratio with the full width of the moniter picture.

(25) Evaluation of magnetic disc characteristics (output, dropout)

The produced polyester film (75 μm thick) was provided with a magnetic layer by a conventional method and formed into a microfloppy disc having a diameter of 3.5 inches.

(25-1) Output of disc

Signals were recorded on tracks of the floppy disc by a floppy disc drive under the conditions of 20° C. and 35% RH and then reproduced. The output was measured and evaluated according to the following criterion:

o: Good
Δ: Rather bad
x: Very bad (2.5-2) Dropout

RP signals were envelope detected and regulated in waveshape thereof by a selecting circuit. The number of dropouts per unit time was counted and expressed by a relative value to the number of dropouts in Comparative Example 5 (number of dropouts/number of dropouts in Comparative Example 5). The smaller the value, the better.

(26) Determination of CR value at high temperatures

Measurement was made after leaving a capacitor in a 125° C. thermostat for one hour. Electrostatic capacity C was measured by using "RLC Digibridge" made by General Radio Inc. under the conditions of 1 kHz and 0.3 Vrms. Measurement of electric resistance R was made by applying DC 100 V to the capacitor and reading the indicated value one minute later by using a super-insulation resistance tester made by Yokokawa Hewlett Packard. The product of thus determined C and R was expressed as CR value (Ω·F).

(27) Capacitor capacity

Aluminum was deposited on the film by a vacuum depositing apparatus, and this film was slit in such a way that the width of the deposited portion would become 10 mm. Two 2-meter long slit tapes having different size of right and left non-deposited sides (margins) were piled and wound together, followed by sealing of end face and connection of lead wires to form a capacitor element. The electrostatic capacity of this capacitor element was measured under an atmosphere of 23° C. and 50% RH under the conditions of 1 kHz and 0.3 Vrms by using "RLC Digibridge" made by General Radio Inc.

(28) Measurement of dielectric strength

By using a 100 kV DC dielectric strength tester, the electrode ends of the capacitor element obtained in (27) were connected to the tester by clips and the tester voltage was raised at a rate of 100 V/sec. The voltage at the moment when the capacitor was broken to cause shortcircuiting was read.

(29) Life characteristics

A DC voltage of 300 V was applied to both electrode ends of the capacitors obtained in (27). The test was conducted under an atmosphere of 85° C. for accelerated testing. Of total 100 capacitor elements tested, those which maintained the normal function as capacitor without causing shortcircuiting after the passage of 1,000 hours were counted and their number was indicated as residual rate.

The fine spherical silica particles used in the Examples were prepared according to the following synthesizing method.

SYNTHESIS OF SILICA PARTICLES 30.4 g of tetramethylsilane was dissolved in 397 g of methanol and maintained at 20° C. (solution A). Separately, 95 g of water was added to 878 g of methanol and this solution was mixed with 243 g of a 28% aqueous ammonia solution and maintained at 20° C. (solution B). Then solution A was added to solution B under stirring. Upon addition, there took place hydrolysis and condensation reaction, and the reaction system became cloudy. After the addition of solution A has been completed, the mixed solution was further stirred for one hour and then added with 288 g of ethylene glycol. The mixture was then heated under reduced pressure to distil off excess water, methanol and ammonia, obtaining an ethylene glycol slurry containing silica in a concentration of 4%. After drying this ethylene glycol slurry, the average particle diameter was determined by electron microphotograph. The average particle diameter was 0.15 μm and $d_{10}/d_{90}$ was 1.59. There were obtained the uniform spherical particles with extremely high uniformity in size. The slurry was subjected to a filtering treatment by using a filter having a filtering ability of 3 μm cuts. The slurry showed excellent filtering characteristics.

The fine spherical silica particles obtained in the manner described above had a purity of 99% or above. There were also obtained the silica particles differing in average diameter, particle size distribution, volumetric shape parameter and specific surface area ratio by changing the conditions for producing the particles such as the amounts of methanol, water and ammonia solution in solution B.

POLYESTER FILM—A

Example A-1

100 parts of dimethyl terephthalate, 70 parts of ethylene glycol, 0.10 part of calcium acetate monohydrate and 0.17 parts of lithium acetate dihydrate were supplied into a reactor, and the mixture was heated to distill off methanol and effect an ester exchange reaction. The temperature was allowed to reach 230° C. in about 4 hours from the start of the reaction, at which the ester exchange reaction was substantially completed.

The reaction product was heated to 235° C., then added with 0.30 parts of triethyl phosphate (1.2 equivalents to metallic compound), followed by further addition of 0.05 parts of antimony trioxide, and then polymerized according to a conventional method to obtain a polyester (material A).

Many uniform and fine (0.5–1 μm in diameter) precipitated particles including calcium, lithium and phosphorus elements were seen in the polyester, the amount of such particles being 0.4% by weight based on the polyester.

Separately, there was obtained a polyester composition containing fine spherical silica particles (material B) in the same way as the preparation of material A except that 0.10 part of calcium acetate monohydrate alone was used for the ester exchange reaction, and then 0.04 parts of phosphoric acid, 0.06 parts of fine spherical silica particles having a diameter of 0.7 μm and 0.05 parts of antimony trioxide were added.

Then the materials A and B were mixed in a blender so that their weight ratio would become 50 to 50, and the mixture was dried and melt extruded at 285° C. to obtain a 185 μm thick amorphous film.

This film was stretched 3.5 times in both machine and transverse directions, heat set at 190° C. and then cooled to obtain a 15 μm thick biaxially stretched film.

The protuberances on the film were measured by a double beam interference method; which showed that the number of coarse protuberances forming interference fringes of 3rd and higher orders was 12 per $cm^2$. The results of evaluations on wear resistance, slip characteristics and dropout of this film are shown in Table 1.

Example A-2

A biaxially stretched polyester film was obtained according to the same process as Example A-1 except that the diameter and content of fine spherical silica particles contained in polyester film were changed as shown in Table 1. The evaluation results of this film are also shown in Table 1.

Example A-3

Another biaxially stretched polyester film was produced by following the process of Example A-1 except that the diameter and content of fine spherical silica particles contained in polyester film were changed as shown in Table 1. The evaluation results of this film are shown in Table 1.

Any of the films according to Examples A-1 to A-3 is very excellent in wear resistance, few in coarse protuberances on the film surface and markedly reduced in dropouts. Slipping properties are also excellent.

The film of Example A-3 is further improved in slip characteristics as it contains the particles of larger diameter (1.5 μm), but this film is slightly increased in dropouts because of the presence of a greater number of coarse protuberances on the film surface than the films of Examples A-1 and A-2.

highly uniform in diameter and could be passed smoothly through the above filter. These particles were

TABLE 1

| EXAMPLE | Additive particles contained in film | | | Precipitated particles contained in film | | | Biaxially stretched polyester film | | | | |
|---|---|---|---|---|---|---|---|---|---|---|---|
| | | | | | | | Number of coarse protuberances (per cm$^2$) | | | | |
| | Type | Average diameter ($\mu$m) | Content (wt %) | Type | Average diameter ($\mu$m) | Content (wt %) | 3rd order ($H_3$) | 4th order ($H_4$) | 5th order ($H_5$) | 6th order ($H_6$) | 7th and higher orders |
| A-1 | Spherical silica particles* | 0.7 | 0.03 | Precipitated particles containing Ca, Li and P** | 0.5–1 | 0.4 | 11 | 1 | 0 | 0 | 0 |
| A-2 | Spherical silica particles* | 0.9 | 0.006 | Precipitated particles containing Ca, Li and P** | " | " | 12 | 1 | 0 | 0 | 0 |
| A-3 | Spherical silica particles* | 1.5 | 0.005 | Precipitated particles containing Ca, Li and P** | " | " | 15 | 1 | 0 | 0 | 0 |

| | Biaxially stretched polyester film | | |
|---|---|---|---|
| EXAMPLE | Wear resistance (rank) | Slipping properties (coefficient of kinetic friction, $\mu d$) | Dropouts after 20 times of repeated use |
| A-1 | A | 0.31 | 2 |
| A-2 | A | 0.30 | 2 |
| A-3 | A | 0.29 | 4 |

*Volumetric shape parameter $\phi v$: 0.5. Deviation from average particle diameter: 3%.
**Containing 1.5% by weight of Ca, 1.5% by weight of Li and 5.0% by weight of P.

POLYESTER FILM—B

The fine spherical silica particles used in the Examples shown below were obtained according to the following synthesis method.

SYNTHESIS OF FINE SPHERICAL SILICA PARTICLES 30.4 g of tetramethylsilane was dissolved in methanol and maintained at 20° C. (solution A).

On the other hand, 110 g of water was added to 900 g of methanol, to which 243 g of a 28% aqueous ammonia solution was added and mixed, and the mixed solution was maintained at 20° C. (solution B).

Solution A was added to solution B while stirring. Immediately thereafter, there took place a hydrolysis and a condensation reaction, and the reaction system became cloudy. After addition of solution A, the mixed solution was further stirred for 2 hours, then added with 103 g of ethylene glycol and heated under reduced pressure to distill off excess water, methanol and ammonia, thereby preparing an ethylene glycol slurry containing fine spherical silica particles in a concentration of 10%. After drying this ethylene glycol slurry, it was photographed through an electron microscope to determine the average particle diameter and diameter dispersion index ($d_{10}/d_{90}$). The average particle diameter was 0.30 $\mu$m and $d_{10}/d_{90}$ = 1.55. Thus, the slurry was composed of uniform spherical particles with highly uniform diameter. The slurry was filtered by using a filter having such a filtering ability as capable of removing the particles of 3 $\mu$m or greater in diameter. The slurry could be passed smoothly through the filter. The particles were used as fine particles (A).

There were also synthesized fine spherical silica particles by the same method as described above except that the mixing ratios of methanol, water and ammonia solution in solution B were changed. These particles had an average diameter of 0.50 $\mu$m and a $d_{10}/d_{90}$ value of 1.27. They were the uniform spherical particles used as fine particles (B).

Example B-1:

100 parts of dimethyl terephthalate, 60 parts of ethylene glycol and 0.09 parts of magnesium acetate tetrahydrate were supplied into a reactor, and the mixture was heated while distilling off methanol to effect an ester exchange reaction. The temperature was raised to 230° C. in 4 hours from the start of the reaction, at which the ester exchange reaction was substantially completed.

To the reaction product was added a mixture of the ethylene glycol slurry containing 0.3% of fine particles (A) having an average diameter of 0.30 $\mu$m and the ethylene glycol slurry containing 0.02% of fine particles (B) having an average diameter of 0.50 $\mu$m, which had been previously mixed well, and the resulting mixture was further added with 0.04 parts of ethyl acid phosphate and 0.035 parts of antimony trioxide and subjected to 4-hour polycondensation reaction to obtain a polyethylene terephthalate composition having an intrinsic viscosity of 0.66.

The thus obtained polyester composition was dried by heating at 180° C. under a nitrogen atmosphere for 6 hours and extruded into a $\mu$m thick sheet. The sheet was then stretched 3.7 times in the machine direction and 4 times in the transverse direction and heat set at 220° C. for 5 seconds to obtain a 10 $\mu$m thick biaxially stretched polyethylene terephthalate film.

The properties of the obtained polyester film are shown in Table 2. As seen from Table 2 this film was very excellent in surface roughness, slipping properties, wear resistance, winding characteristics and number of coarse protuberances, and the polyester composition was also quite satisfactory as a starting material for a base film for magnetic tapes.

Examples B-2 and B-3

Other fine spherical silica particles having different average diameters were produced by following the same operations as in Example B-1 except that the mixing ratios of methanol, water and ammonia solution in solution B were changed. Polyester films were obtained by using these particles according to the procedure of Example F-1 by changing the content of the particles. The properties of the obtained polyester films are shown in Table 2. As seen from Table 2, these polyester films were excellent in surface roughness, slip characteristics, wear resistance, winding characteristics and number of coarse protuberances and showed excellent availability as a base film for magnetic tapes.

Example B-4

A polyester film was obtained by following the same operations as in Example B-1 except that fine spherical silica particles (average diameter: 0.30 μm, $d_{10}/d_{90}=1.55$) prepared according to the process of Example B-1 were used as fine particles (A), and that heavy calcium carbonate particles (average diameter: 0.50 μ, $d_{10}/d_{90}=2.65$) produced by conducting wet crushing, wet classification and filtration in the known ways were used as fine particles (B). The properties of this polyester film are shown in Table 2. As seen from Table 2, this film was excellent in surface roughness, slipping properties, wear resistance, winding characteristics and number of coarse protuberances and satisfied the property requirement as a base film for magnetic tapes.

terephthalate composition having an intrinsic viscosity of 0.66.

The thus obtained polyester composition was dried by heating at 180° C. under a nitrogen atmosphere for 6 hours, then extruded into a sheet by an extruder and cooled by an electrostatic cooling method to prepare a 150 μm thick amorphous sheet. This sheet was stretched 4 times in the machine direction and 3.5 times in the transverse direction and then further stretched 1.07 times in the machine direction to obtain a 10 μm thick biaxially stretched film strengthened in the machine direction. The properties of this film are shown in Table 7. The "conforming ratio in friction" in the table is the ratio (%) of the films having a coefficient of friction (μd) falling within the allowable range of ±5% in deviation from the prescribed value of μd to the total number of films tested. The films produced according to this Example conformed to the standard in each of the test items: conforming ratio in friction, number of times of break and adhesion of white powder.

Examples C-2 and C-3

Stretched polyester films were obtained in the same way as Example C-1 except that the fine spherical silica particles different in the average diameter from those of Example C-1 were used, and that the re-stretch ratio was 1.12 times. The properties of these films are shown in Table 3.

TABLE 2

| | Particle | | | | | | | | Film properties | |
|---|---|---|---|---|---|---|---|---|---|---|
| | Fine particles (A) | | | | Fine particles (B) | | | | | |
| EXAMPLE | Type | Ave. diameter (μm) | $d_{10}/d_{90}$ | Content (%) | Type | Ave. diameter (μ) | $d_{10}/d_{90}$ | $D_2/D_1$ | Content (%) | Surface roughness Ra (μm) | Coefficient of friction (μd) |
| B-1 | Spherical silica | 0.30 | 1.55 | 0.3 | Spherical silica | 0.50 | 1.73 | 1.7 | 0.02 | 0.013 | 0.28 |
| B-2 | Spherical silica | 0.50 | 1.73 | 0.3 | Spherical silica | 0.80 | 1.66 | 1.6 | 0.01 | 0.017 | 0.24 |
| B-3 | Spherical silica | 0.08 | 1.85 | 0.3 | Spherical silica | 0115 | 1.50 | 1.9 | 0.02 | 0.008 | 0.33 |
| B-4 | Spherical silica | 0.30 | 1.55 | 0.3 | Calcium carbonate | 0.50 | 2.65 | 1.7 | 0.02 | 0.014 | 0.29 |

| | Film properties | | | |
|---|---|---|---|---|
| EXAMPLE | Wear resistance | Winding characteristics | Number of coarse protuberances per 25 cm² H₃ or greater | General evaluation |
| B-1 | ⊚ | ⊚ | 3 | ⊚ |
| B-2 | ⊚ | ⊚ | 5 | ⊚ |
| B-3 | ⊚ | ○ | 2 | ○ |
| B-4 | ○ | ○ | 10 | ○ |

POLYESTER FILM—C

Example C-1

100 parts of dimethyl terephthalate, 60 parts of ethylene glycol and 0.09 parts of magnesium acetate tetrahydrate were supplied into a reactor, and the mixture was heated while distilling off methanol to effect an ester exchange reaction. The temperature was elevated to 230° in 4 hours from the start of the reaction, at which the ester exchange reaction was substantially completed. To the reaction product was added an ethylene glycol slurry containing 0.3% of spherical silica particles having an average diameter of 0.27 μm, followed by further addition of 0.04 parts of ethyl acid phosphate and 0.035 parts of antimony trioxide for carrying out polycondensation for 4 hours to obtain a polyethylene The films obtained in Examples C-2 and C-3 were all satisfactory in conforming ratio in friction, number of times of break and adhesion of white powder.

Example C-4

Pellets of polyethylene-2,6-naphthalate containing 0.3% of fine spherical silica particles of 0.27 μm in average diameter obtained according to the method of Example C-1 were dried at 170° C. under nitrogen for 6 hours. The thus obtained polyester composition was melt extruded by a known method to form a 132 μm thick non-stretched film, and this film was stretched 4.5 times in the machine direction and 4 times in the transverse direction, and then further stretched 1.05 times in the machine direction to obtain a 7 μm thick biaxially stretched film strengthened in the machine direction. The properties of this film are shown in Table 3. This film was satisfactory in conforming ratio in friction, number of times of break and adhesion of white powder.

TABLE 3

| | Type of polyester | Inactive particles in polyester | | | Stretch ratio | | | $F_5$ value in machine direction ($Kg/cm^2$) | Property values of central portion of film | |
|---|---|---|---|---|---|---|---|---|---|---|
| | | Type of particle | Diameter (μm) | Content (wt %) | MD | TD | re-MD | | Coefficient of friction | Ra (μm) |
| EXAMPLE C-1 | PET*[1] | Spherical silica | 0.27 | 0.3 | 4 | 3.5 | 1.07 | 16 | 0.28 | 0.010 |
| EXAMPLE C-2 | PET | Spherical silica | 0.43 | 0.3 | 4 | 3.5 | 1.12 | 19 | 0.26 | 0.016 |
| EXAMPLE C-3 | PET | Spherical silica | 0.85 | 0.4 | 4 | 3.5 | 1.12 | 19 | 0.20 | 0.029 |
| EXAMPLE C-4 | PEN*[2] | Spherical silica | 0.27 | 0.3 | 4.5 | 4 | 1.05 | 29 | 0.30 | 0.008 |

| | Property values of side portion of film | | conforming ratio in friction (%) | Number of breaks per 100,000 meters | Adhesion of white powder (grading) |
|---|---|---|---|---|---|
| | Coefficient of friction (μd) | Ra (μm) | | | |
| EXAMPLE C-1 | 0.29 | 0.009 | 100 | 0 | ○ |
| EXAMPLE C-2 | 0.27 | 0.015 | 100 | 0 | ○ |
| EXAMPLE C-3 | 0.21 | 0.028 | 100 | 1 | ○ |
| EXAMPLE C-4 | 0.32 | 0.007 | 100 | 0 | ○ |

*[1] polyethylene terephthalate
*[2] polyethylene-2,6-naphthalate

POLYESTER FILM—D

The spherical silica particles used in the Examples shown below were obtained from the following method.

SYNTHESIS OF SPHERICAL SILICA PARTICLES 30.4 g of tetramethylsilane was dissolved in 400 g of methanol and maintained at 20° C. (solution A).

Separately, 110 g of water was added to 900 g of methanol, followed by addition of 243 g of a 28% aqueous ammonia solution, and the mixed solution was maintained at 20° C. (solution B).

Solution A was added to solution B while stirring. Immediately after addition, there took place a hydrolysis and a condensation reaction, and the reaction system became cloudy. After addition of solution A, the mixed solution was further stirred for 2 hours, then added with 103 g of ethylene glycol and heated under reduced pressure to distill off excess water, methanol and ammonia, thereby obtaining an ethylene glycol slurry containing fine spherical silica particles in a concentration of 10%. This ethylene glycol slurry was dried and photographed through an electron microscope, thereby finding that the average particle diameter was 0.09 μm and $d_{10}/d_{90}=1.45$. Thus, the silica particles were composed of uniform particles with an extremely narrow particle size distribution. When the slurry was filtered by using a filter having a filtering ability of 3 μm cuts, the slurry could be passed smoothly through the filter. These particles were used as fine particles (A). Calcium carbonate particles of 0.27 μm in average diameter obtained by conducting wet classification and filtration in the known ways were used as particles (B).

Example D-1

100 parts of dimethyl terephthalate, 60 parts of ethylene glycol and 0.09 parts of magnesium acetate tetrahydrate were supplied into a reactor, and the mixture was heated to distill off methanol and to effect an ester exchange reaction. The temperature was raised to 230° C. in 4 hours from the start of the reaction, at which the ester exchange reaction was substantially completed. To the reaction product was added well-mixed mixture of the ethylene glycol containing 0.3% of fine particles (A) having an average diameter of 0.09 μm and the ethylene glycol containing 0.02% of particles (B) having an average diameter of 0.27μm, followed by further addition of 0.04 parts of ethyl acid phosphate and 0.035 parts of antimony trioxide, and the mixture was polycondensed for 4 hours to obtain a polyethylene terephthalate composition having an intrinsic viscosity of 0.66. The obtained polyester composition was dried by heating at 180° C. under a nitrogen atmosphere for 6 hours and then subjected to extrusion to form a 150 μm thick sheet. The sheet was stretched 3.7 times in the machine direction and 4 times in the transverse direction and heat set at 220° C. for 5 seconds to obtain a 10 μm thick biaxially stretched polyethylene terephthalate film.

The properties of this film are shown in Table 4. As seen from Table 4, this film was very excellent in surface roughness, slipping properties, wear resistance, winding characteristics, number of coarse protuberances and resistant to scratching. This film was well appliable as a base film for magnetic recording media.

Examples D-2–D-5

Fine spherical silica particles having an average diameter of 0.20 μm and a $d_{10}/d_{90}$ of 1.56 were obtained according to the process of Example D-1 except for changing the mixing ratios of methanol, water and ammonia solution in solution B, and a polyester film was obtained in the same way as Example D-1 except that the obtained fine silica particles were used as fine particles (A) in an amount of 0.3% and the particles shown in Table 4 were added as particles (B) in an amount of 0.02%.

The properties of the obtained film are shown in Table 4. As seen from Table 4, any of the films obtained in Examples D-1 to D-5 was very excellent in surface roughness, slipping properties, wear resistance, winding characteristics, number of coarse protuberances and resistance to scratching and could well applicable as a base film for magnetic recording media.

C. in 4 hours from the start of the reaction, at which the ester exchange reaction was substantially completed.

To the reaction product was added 7.5 parts of ethylene glycol slurry of fine spherical silica particles described in Table 5, followed by further addition of 0.04 parts of ethyl acid phosphate and 0.04 parts of antimony trioxide to carry out a polycondensation reaction for 4 hours to obtain a polyethylene terephthalate composition.

TABLE 4

| EXAMPLE | Particles added ||||||||| Film properties ||
| | Fine particles (A) ||| Fine particles (B) |||||| Surface roughness [Ra] (μm) | Coefficient of friction [μd] |
| | Type | Diameter (μm) | ($d_{10}/d_{90}$) | Content (wt %) | Type | Mohs hardness | Diameter (μm) | $D_2/D_1$ | Content (wt %) | | |
| D-1 | Spherical silica | 0.09 | 1.45 | 0.3 | Calcium carbonate | 3.0 | 0.27 | 3.0 | 0.02 | 0.008 | 0.34 |
| D-2 | Spherical silica | 0.20 | 1.56 | 0.3 | Calcium carbonate | 3.0 | 0.42 | 2.1 | 0.02 | 0.010 | 0.30 |
| D-3 | Spherical silica | 0.20 | 1.56 | 0.3 | Barium sulfate | 3.0 | 0.45 | 2.3 | 0.02 | 0.011 | 0.30 |
| D-4 | Spherical silica | 0.20 | 1.56 | 0.3 | Magnesium hydroxide | 2.5 | 0.35 | 1.8 | 0.02 | 0.010 | 0.31 |
| D-5 | Spherical silica | 0.20 | 1.56 | 0.3 | Zinc oxide | 4.0 | 0.50 | 2.5 | 0.02 | 0.011 | 0.31 |

| EXAMPLE | Film properties |||||
| | Wear resistance | Winding characteristics | Number of coarse protuberances per 25 cm² | Resistance to scratching (%) | General evaluation |
| D-1 | ⊚ | ⊚ | 2 | 0.1 | ⊚ |
| D-2 | ⊚ | ⊚ | 4 | 0.5 | ⊚ |
| D-3 | ⊚ | ⊚ | 7 | 0.6 | ⊚ |
| D-4 | ⊚ | ⊚ | 6 | 0.4 | ⊚ |
| D-5 | ⊚ | ⊚ | 8 | 1.5 | ○ |

MAGNETIC RECORDING MEDIA—A

Examples E-1–E-5

100 parts of dimethyl terephthalate, 60 parts of ethylene glycol and 0.09 parts of magnesium acetate tetrahydrate were supplied into a reactor, and the mixture was heated while distilling off methanol to effect an ester exchange reaction. The temperature was raised to 230°

This polyester composition was vacuum dried, extruded into a sheet at 290° C. from an extruder and cooled by an electrostatic cooling method to form a 200 μm amorphous sheet. This amorphous sheet was stretched 3.7 times in the machine direction by a multi-stage machine direction stretcher, then stretched 4.0 times in the transverse direction by a tenter and then heat set in the temperature range of 200° C. or higher to obtain a 14 μm thick biaxially stretched film. The properties of this film and the properties of the magnetic tape made therefrom are shown in Table 5.

TABLE 5

| | Inactive particles in polyester film ||||||| Refractive index of film || Film properties ||
| | Type of particle | Diameter (μm) | Content (wt %) | $d_{10}/d_{90}$ | Volumetric shape parameter | Specific surface area ratio | In thicknesswise direction (nα) | Average (n̄) | Handling characteristics | Wear resistance |
| EXAMPLE E-1 | Silica | 0.20 | 0.60 | 1.20 | 0.50 | 15 | 1.496 | 1.602 | ○ | A |
| EXAMPLE E-2 | " | 0.30 | 0.40 | 1.06 | " | 24 | " | 1.603 | ○ | A |
| EXAMPLE E-3 | " | 0.55 | 0.20 | 1.12 | " | 53 | " | 1.604 | ○ | A |
| EXAMPLE E-4 | " | 0.75 | " | 1.15 | 0.48 | 41 | 1.500 | " | ○ | A |
| EXAMPLE E-5 | " | 0.85 | 0.10 | 1.17 | 0.46 | 67 | 1.498 | " | ○ | A |

| Film properties || Properties of magnetic tape || |
| Number of coarse protuberances per 100 cm² | Number of broken protuberances per mm² | Electrical properties (dB) | Dropout (Dφ) per min | General evaluation |

TABLE 5-continued

| | | | | | |
|---|---|---|---|---|---|
| EXAMPLE E-1 | 6 | 1 | +2.7 | 1.5 | ○ |
| EXAMPLE E-2 | 5 | 1 | +2.5 | 1.3 | ○ |
| EXAMPLE E-3 | 7 | 2 | +1.4 | 0.5 | ○ |
| EXAMPLE E-4 | 8 | 4 | +0.5 | 1.3 | ○ |
| EXAMPLE E-5 | 10 | 6 | 0.0 | 1.9 | ○ |

MAGNETIC RECORDING MEDIA—B films had excellent electro-magnetic transducing characteristics and running property.

TABLE 6

| EXAMPLE | Inactive particles in polyester | | | $\rho v$ ($\times 10^7 \Omega \cdot cm$) | Film properties | | | | |
|---|---|---|---|---|---|---|---|---|---|
| | Type | Diameter ($\mu m$) | Content (wt %) | $d_{10}/d_{90}$ | | Double refractive index $\Delta n$ ($\times 10^3$) | Number of broken protuberances per mm$^2$ | Coefficient of kinetic friction ($\mu d$) | Ra ($\mu m$) | Wear resistance |
| F-1 | Silica | 0.27 | 0.30 | 1.10 | 3.0 | 0.8 | 2 | 0.28 | 0.010 | A |
| F-2 | " | 0.43 | 0.30 | 1.15 | 3.5 | 3.2 | 1 | 0.26 | 0.016 | A |
| F-3 | " | 0.58 | 0.40 | 1.07 | 2.1 | 5.1 | 3 | 0.23 | 0.021 | A |
| F-4 | " | 0.75 | 0.20 | 1.18 | 4.0 | 2.0 | 4 | 0.22 | 0.020 | A |
| F-5 | " | 0.90 | 0.10 | 1.20 | 2.7 | 0.2 | 6 | 0.21 | 0.022 | A |

| EXAMPLE | Magnetic tape properties | | | General evaluation |
|---|---|---|---|---|
| | S/N (dB) | Dropout (per min) | Skew ($\mu sec$) | |
| F-1 | +4.0 | 1.5 | 8 | ○ |
| F-2 | +2.5 | 1.3 | 7 | ○ |
| F-3 | +1.4 | 2.1 | 8 | ○ |
| F-4 | +0.5 | 1.8 | 6 | ○ |
| F-5 | 0.0 | 3.2 | 9 | ○ |

EXAMPLES F-1–F-5

100 parts of dimethyl terephthalate, 60 parts of ethylene glycol and 0.18 parts of magnesium acetate tetrahydrate were supplied into a reactor, and the mixture was heated while distilling off methanol to effect an ester exchange reaction. The temperature was raised to 230° C. in 4 hours from the start of the reaction, at which the ester exchange reaction was substantially completed.

To the reaction product was added 7.5 parts of an ethylene glycol slurry of fine spherical silica particles shown in Table 6, followed by further addition of 0.04 parts of ethyl acid phosphate and 0.04 parts of antimony trioxide to carry out a polycondensation reaction for 4 hours, thereby obtaining ethylene terephthalate compositions.

Each of these polyester compositions was vacuum dried, extruded into a sheet at 290° C. and cooled by an electrostatic cooling method to form a 200 $\mu$m thick amorphous sheet. This amorphous sheet was then stretched 3.7 times in the machine direction by a multistage machine direction stretcher, further stretched 4.0 times in the transverse direction by a tenter and then heat set in a temperature range of 200° C. or over to obtain a 14 $\mu$m thick biaxially stretched film. The properties of the obtained films and the properties of the magnetic tapes made therefrom are shown in Table 6.

Any of the films of Examples F-1 to F-5 could be rolled up after slit in a very favorable way with no nonuniformity at the end face and no wrinkle on the film. Also, the film suffered from no wear and scratches which could usually be caused when roll up the magnetic tape in the magnetic tape forming process, and the deposition of white powder on the calendering rolls was slight. Further, the magnetic tapes formed from the films had excellent electro-magnetic transducing characteristics and running property.

MAGNETIC RECORDING MEDIA—C

Example G-1

100 parts of dimethyl terephthalate, 70 parts of ethylene glycol and 0.10 part of calcium acetate monohydrate were supplied into a reactor, and the mixture was heated while distilling off methanol to effect an ester exchange reaction. The temperature was allowed to reach 230° C. in about 4 hours from the start of the reaction, at which the ester exchange reaction was substantially completed.

This reaction product was further heated to 235° C. and added with 0.04 parts of phosphoric acid and 0.3 parts of fine silica particles (average diameter: 0.30 $\mu$m, $d_{10}/d_{90}=1.4$, $\phi_v=0.51$) as a slurry in ethylene glycol, followed by further addition of 0.05 parts of antimony trioxide, and the mixture was subjected to a polymerization reaction according to a conventional method. That is, after addition of antimony trioxide, the temperature of the reaction system was gradually raised till reaching 285° C. while the pressure was gradually reduced from normal pressure to 1 mmHg. After 4 hours of reaction, the reaction system was returned to normal pressure to obtain a polyester composition (polyester composition A).

Polyester composition A contained 0.30 parts by weight (to 100 parts by weight of polyester) of fine silica particles.

The thus obtained chip-formed polyester composition A was dried, extruded into a sheet at 290° C. by an extruder and cooled by an electrostatic cooling method to form an amorphous sheet. This sheet was stretched 3.2 times in the machine direction and 3.7 times in the transverse direction and then heat treated at 215° C. to obtain a biaxially oriented film having a thickness of 75 μm.

Examples G-2 and G-3

Polyester compositions were obtained in the same way as in Example G-1 except for changing fine silica particles added. That is, in Example G-2, the average particle diameter was changed to 0.50 μm, and in Example G-3, the average particle diameter was changed to 0.70 μm and the particle content was changed to 0.25 parts by weight.

The compositions were subjected to the same treatments as in Example G-1 to obtain biaxially oriented films having a thickness of 75 μm.

It is seen from Examples G-1 to G-3 that the addition of spherical silica particles of the present invention can greatly reduce the number of the coarse particle protuberances on the film surface while maintaining good slip characteristics and wear resistance, and as a result, there can be obtained a base film for magnetic disc having excellent magnetic disc properties, especially very few dropouts.

As seen from the above results, the oriented polyeser film of the present invention is best suited for use as a base film for magnetic discs, especially high-density recording floppy discs.

3.7 times in the machine direction by a machine direction stretcher, further stretched 4.0 times in the transeverse direction by a tenter and heat set in the temperature range of 200° C. or over to obtain a 14 μm thick biaxially stretched film.

200 parts of fine powder of a ferromagnetic alloy (Fe-Co-B), 30 parts of polyurethane resin, 10 parts of nitrocellulose, 10 parts of vinyl chloride-vinyl acetate copolymer, 5 parts of lecithin, 100 parts of cyclohexanone, 100 parts of methyl isobutyl ketone and 300 parts of methyl ethyl ketone were mixed and dispersed in a ball mill for 48 hours, and then 5 parts of polyisocyanate compound was added to prepare a magnetic coating material. Said biaxially stretched film was coated with this magnetic coating material, magnetically oriented before the coat was sufficiently dried and solidified, and then dried. This coated film was supercalendered and slit to a width of ½ inch to form a video tape.

The properties of the film and the magnetic recording tape obtained in the manner described above are shown in Table 8. The film has satisfied the requirements of the present invention for Ra, Rt/Ra and number of broken protuberances and was excellent in electromagnetic transducing characteristics as a magnetic tape, handling characteristics in coating and calendering steps, and wear resistance.

TABLE 7

| | | Fine particles | | | | Results of measurements and evaluations | | | | | |
| | | | | | | Surface quality | | | | | |
| | | | | | | | Number of coarse protuberances per 25 cm² | | | | Magnetic disc properties |
| EXAMPLE | Type | Average diameter (μm) | $d_{10}/d_{90}$ | $\phi_v$ | Content (wt parts to 100 wt parts of PET) | Ra (μm) | $H_2$ | $H_3$ or greater | Slipping properties | Wear resistance | Output | Dropouts |
| --- | --- | --- | --- | --- | --- | --- | --- | --- | --- | --- | --- | --- |
| G-1 | Silica (external addition) | 0.30 | 1.4 | 0.51 | 0.30 | 0.009 | 0 | 0 | Good | ○ | ○ | 0.10 |
| G-2 | Silica (external addition) | 0.50 | 1.4 | 0.51 | 0.30 | 0.010 | 2 | 0 | Good | ○ | ○ | 0.15 |
| G-3 | Silica (external addition) | 0.70 | 1.4 | 0.51 | 0.25 | 0.010 | 4 | 0 | Good | ○ | ○ | 0.20 |

MAGNETIC RECORDING MEDIA—D

Example H-1

100 parts of dimethyl terephthalate, 60 parts of ethylene glycol and 0.09 parts of magnesium acetate tetrahydrate were supplied into a reactor, and the mixture was heated while distilling off methanol to effect an ester exchange reaction. The temperature was raised to 230° C. in 4 hours from the start of the reaction, at which the ester exchange reaction was substantially completed.

To the reaction product was added 15 parts of an ethylene glycol slurry containing fine spherical silica particles of 0.27 μm in average diameter, followed by addition of 0.04 parts of ethyl acid phosphate and 0.04 parts of antimony trioxide for carrying out polycondensation reaction for 4 hours, resultantly obtaining a polyethylene terephthalate composition.

The thus obtained polyester composition was dried by heating at 180° C. under a nitrogen atmosphere, then melt extruded into a sheet by an extruder and cooled by an electrostatic cooling method to obtain a 200 μm thick amorphous sheet. This sheet was then stretched

Examples H-2 to H-4

Magnetic recording tapes were made according to the same process as in Example H-1, except for use of fine spherical silica particles different in average diameter and content as shown in Table 8. The properties of these magnetic tapes are shown in Table 8. As seen from Table 8, the magnetic recording tapes of Examples H-2 to H-4 all had excellent properties.

Example H-5

A magnetic recording tape was obtained according to the same process as in Example H-1 except that dimethyl terephthalate was changed to dimethyl naphthalene to form a polyethylene naphthalate composition, and that this composition was made into a 14 μm thick biaxially stretched film. The properties of the obtained magnetic tape are shown in Table 8. This tape was as excellent in handling characteristics, wear resistance and elctromagnetic transducing characteristics as the magnetic recording tape obtained in Example H-1.

TABLE 8

| | Type of base film | Inactive particles in base film | | | Base film surface condition | | | Coating and calendering characteristics | | Magnetic tape characteristics | |
|---|---|---|---|---|---|---|---|---|---|---|---|
| | | Type | Average diameter (μm) | Content (wt %) | Ra (μm) | Rt/Ra | Number of broken protuberances per mm² | Coefficient of friction (μd) | Fouling of calender roll | S/N (dB) | Dropouts (per min) |
| EXAMPLE H-1 | Polyethylene terephthalate | Spherical silica | 0.27 | 0.3 | 0.009 | 12 | 3 | 0.22 | ○ | +1.5 | 3 |
| EXAMPLE H-2 | Polyethylene terephthalate | Spherical silica | 0.43 | 0.2 | 0.012 | 9 | 6 | 0.20 | ○ | +0.0 | 5 |
| EXAMPLE H-3 | Polyethylene terephthalate | Spherical silica | 0.16 | 0.3 | 0.007 | 10 | 1 | 0.25 | ○ | +2.0 | 2 |
| EXAMPLE H-4 | Polyethylene terephthalate | Spherical silica | 0.35 | 0.2 | 0.011 | 13 | 3 | 0.20 | ○ | +0.9 | 4 |
| EXAMPLE H-5 | Polyethylene naphthalate | Spherical silica | 0.27 | 0.3 | 0.010 | 14 | 2 | 0.23 | ○ | +1.5 | 5 |

FILM CAPACITOR shown in Table 9. Both the film properties and the electrical properties of the capacitors were excellent.

TABLE 9

| | Inactive particles added | | | Film properties | | | Electrical properties of capacitor | | |
|---|---|---|---|---|---|---|---|---|---|
| | Type | Diameter (μm) | Content (wt %) | Number of protuberances (per mm² × 10³) | Coefficient of kinetic friction (μd) | Δd (μm) | Capacity (μF) | Dielectric strength (kV) | Life (%) |
| EXAMPLE I-1 | Spherical silica | 0.27 | 0.5 | 50 | 0.57 | 0.15 | 0.62 | 1.2 | 98 |
| EXAMPLE I-2 | Spherical silica | 0.54 | 0.6 | 45 | 0.40 | 0.23 | 0.55 | 1.1 | 97 |
| EXAMPLE I-3 | Spherical silica | 0.85 | 0.7 | 30 | 0.35 | 0.32 | 0.53 | 1.0 | 96 |

Example I-1

100 parts of dimethyl terephthalate, 60 parts of ethylene glycol and 0.03 parts of manganese acetate tetrahydrate were supplied into a reactor, and the mixture was heated while distilling off methanol to effect an ester exchange reaction. The reaction was substantially completed when the temperature reached 230° C. in 4 hours after the start of the reaction.

To the reaction product was added an ethylene glycol slurry containing 10% of fine spherical silica particles having an average diameter of 0.27 μm, followed by further addition of 0.021 parts of ethyl acid phosphate and 0.035 parts of antimony trioxide for carrying out polycondensation for 4 hours to obtain a polyethylene terephthalate composition having an intrinsic viscosity of 0.66. The content of said silica particles was 0.5% (based on polyester).

The obtained polyester composition was dried by heating at 180° C. under a nitrogen atmosphere for 6 hours, then extruded into a sheet through an extruder and cooled by an electrostatic cooling method to form a 24 μm thick amorphous sheet. This sheet was stretched 4 times in both machine and transverse directions to obtain a 1.5 μm thick biaxially stretched film.

The properties of this film and the electrical properties of the capacitor made therefrom are shown in Table 9. Both the film properties and the electrical properties of the capacitor were quite satisfactory.

Examples I-2 and I-3

Biaxially stretched films were obtained by following the process of Example I-1 except for using the fine spherical silica particles having average diameters shown in Table 9 which were prepared by different conditions. The properties of these films and the electrical properties of the capacitors made therefrom are

FILM CAPACITOR—B

Example J-1

100 parts of dimethyl terephthalate, 60 parts of ethylene glycol and 0.03 parts of manganese acetate tetrahydrate were supplied into a reactor, and the mixture was heated while distilling off methanol to effect an ester exchange reaction. The temperature was raised to 230° C. in 4 hours from the start of the reaction, at which the ester exchange reaction was substantially completed.

To the reaction product was added 15 parts of an ethylene glycol slurry containing the fine spherical silica particles having an average diameter of 0.75 μm, followed by further addition of 0.021 parts of ethyl acid phosphate and 0.04 parts of antimony trioxide, and the mixture was subjected to 4-hour polycondensation reaction to obtain a polyethylene terephthalate composition.

The obtained polyester composition was dried by heating at 180° C. under a nitrogen atmosphere, then melt extruded into a sheet by an extruder and cooled by an electrostatic cooling method to form a 60 μm thick amorphous sheet. This sheet was stretched 3.7 times in the machine direction by a machine direction stretcher, then stretched 4.0 times in the transverse direction by a tenter and heat set in the temperature range of 200° or over to obtain a 5 μm thick biaxially stretched film. The melt specific resistance of this film was $9.5 \times 10^8$ Ω-cm.

Aluminum was deposited on the obtained film by a vacuum depositing apparatus. This aluminum-deposited film was slit to a width of 15 mm and subjected to an element winding machine by which two pieces of slit tape having different size of right and left non-deposited sides (margins) were piled and wound together to make a capacitor element. This capacitor element was then subjected to pressing, heat treatment, end sealing and connection of lead wires to make a capacitor having a capacity of 0.1 μF.

The properties of the thus obtained capacitor and polyester film are shown in Table 14. There were observed no such defects as "shrinkage", "wrinkling" and "ununiformity of the winding surface" in the steps of depositing, element winding and calendering in the capacitor producing process. Also, the electrical properties of the capacitor were excellent.

Examples J-2 and J-3

Capacitors were made by following the procedure of Example J-1 except that the preparation conditions of fine spherical silica particles were slightly changed and the particles having the average diameters shown in Table 10 were used. The properties of the obtained capacitors are shown in Table 10. These capacitors conforming to the requirements of the present invention had the excellent electrical properties.

TABLE 10

| EXAMPLE | Inactive particles contained in polyester | | | | Melt specific resistance of polyester (Ω · cm) | Coefficient of kinetic friction of film (μd) | Electrical properties of capacitor | | | | General evaluation |
|---|---|---|---|---|---|---|---|---|---|---|---|
| | Type | Average diameter (μm) | Content (wt %) | $d_{10}/d_{90}$ | | | High-temperature CR Value (Ω · F) | Dielectric strength (kV) | Life characteristics (%) | | |
| J-1 | Spherical silica | 0.75 | 0.40 | 1.5 | $9.5 \times 10^8$ | 0.34 | $4.5 \times 10^2$ | 2.1 | 95 | | ○ |
| J-2 | Spherical silica | 1.0 | 0.30 | 1.6 | 15.0 | 0.32 | 4.1 | 1.9 | 94 | | ○ |
| J-3 | Spherical silica | 0.65 | 0.40 | 1.4 | 12.0 | 0.35 | 4.8 | 2.3 | 96 | | ○ |

What is claimed is:

1. A biaxially stretched polyester film which contains 0.05 to 1.0% by weight of inactive particles (B-II) precipitated as a result of the reaction of a phosphorus compound and residue of ester exchange catalyst in the preparation of said polyester in a polyester condensation reaction system and 0.001 to 5% by weight of fine spherical silica particles obtained by subjecting alkoxysilane to hydrolysis reaction and condensation reaction, said silica particles being substantially amorphous and having an average diameter of 0.01 to 3.0 μm, the diameter dispersion index of said particles represented by the following formula being in the range of 1.1 to 2.7:

$$d_{10}/d_{90}$$

wherein $d_{10}$ is the average diameter of the particle when the cumulative number thereof is 10% of the total number of said particles, $d_{90}$ is the average diameter of the particle when the cumulative number thereof is 90% of the total number of said particles, and $d_{10}$ and $d_{90}$ are measured under an electron microscope, said cumulative numbers being calculated beginning with the largest particle size.

2. The biaxially stretched polyester film according to claim 1 wherein each of said inactive particles (B-II) is a particle containing calcium, lithium and phosphorus elements each in an amount of 1.0% by weight or more based on said inactive particles.

3. The biaxially stretched polyester film according to claim 1 wherein the number of interference fringes of n-th order ($H_n$, per 1 cm$^2$) as measured by double beam interference method, satisfies the following formulae;

$$\Sigma H_n \leq 20, 7 \geq n \geq 3$$

$$H_n + H_{n+1} \geq 10, 7 \geq n \geq 3$$

4. The biaxially stretched polyester film according to claim 1 wherein said fine spherical silica particles have a volumetric shape parameter defined by the following formula:

$$0.4 \leq \phi_r \geq \pi/6$$

wherein $\phi_v$ is defined as $\phi_v = V/D^3$, wherein V is the volume of particle (μm$^3$) and D is the maximum diameter (μm) of the particle in the projection plane.

5. A biaxially stretched polyester film which contains 0.001 to 5% by weight of fine spherical silica particles obtained by subjecting alkoxysilane to hydrolysis reaction and condensation reaction, said silica particles being substantially amorphous and having an average diameter of 0.01 to 3.0 μm, the diameter dispersion index of said particles represented by the following formula being in the range of 1.1 to 2.7:

$$d_{10}/d_{90}$$

wherein $d_{10}$ is the average diameter of the particle when the cumulative number thereof is 10% of the total number of said particles, $d_{90}$ is the average diameter of the particle when the cumulative number thereof is 90% of the total number of said particles, and $d_{10}$ and $d_{90}$ are measured under an electron microscope, said cumulative numbers being calculated beginning with the largest particle size, and which shows an $F_5$ value in the machine direction of 12 kg/mm$^2$ or above.

6. The biaxially stretched polyester film according to claim 5 wherein said fine spherical silica particles have a volumetric shape parameter defined by the following formula:

$$0.4 \leq \phi_r \leq \pi/6$$

wherein $\phi_v$ is defined as $\phi_v = V/D^3$, wherein V is the volume of particle (μm$^3$) and D is the maximum diameter (μm) of the particle in the projection plane.

7. The biaxially stretched polyester film according to claim 5 wherein said polyester film has the ratio of the $F_5$ value in the machine direction ($F_{5MD}$) and the $F_5$ value in the transverse direction ($F_{5TD}$) defined by the following formula:

$$3.0 \geq F_{5MD}/F_{5TD} \geq 1.1$$

8. A biaxially stretched polyester film which contains 0.001 to 5% by weight of fine spherical silica particles (A) obtained by subjecting alkoxysilane to hydrolysis reaction and condensation reaction, said silica particles being substantially amorphous and having an average diameter of 0.01 to 3.0 μm, the diameter dispersion index of said particles represented by the following formula being in the range of 1.1 to 2.7:

$$d_{10}/d_{90}$$

wherein $d_{10}$ is the average diameter of the particle when the cumulative number thereof is 10% of the total number of said particles, and $d_{10}$ and $d_{90}$ are measured under an electron microscope, said cumulative numbers being calculated beginning with the largest particle size, and 0.005 to 1.0% by weight of fine particles (B-I) other than particles (A) having $(D_2/D_1)$ defined by the following formula of in the range of 1.1 to 3.0:

$$(D_2/D_1) = \frac{\text{average diameter of fine particles } (B - I)}{\text{average diameter of fine particles } (A)}$$

9. A biaxially stretched polyester film which contains 0.001 to 5% by weight of fine spherical silica particles (A) obtained by subjecting alkoxysilane to hydrolysis reaction and condensation reaction, said silica particles being substantially amorphous and having an average diameter of 0.01 to 3.0 μm, the diameter dispersion index of said particles represented by the following formula being in the range of 1.1 to 2.7:

$$d_{10}/d_{90}$$

wherein $d_{10}$ is the average diameter of the particle when the cumulative number thereof is 10% of the total number of said particles, $d_{90}$ is the average diameter of the particle when the cumulative number thereof is 90% of the total number of said particles, and $d_{10}$ and $d_{90}$ are measured under an electron microscope, said cumulative numbers being calculated beginning with the largest particle size, and 0.005 to 1.0% by weight of fine particles (B-I) other than particles (A) having a Mohs hardness of in the range of 1.1 to 3.0:

$$(D_2/D_1) = \frac{\text{average diameter of fine particles } (B - I)}{\text{average diameter of fine particles } (A)}$$

10. A magnetic recording medium which comprises a biaxially stretched polyester film containing 0.001 to 5% by weight of fine spherical silica particles obtained by subjecting alkoxysilane to hydrolysis reaction and condensation reaction, said silica particles being substantially amorphous and having an average diameter of 0.01 to 3.0 μm, the diameter dispersion index of said particles represented by the following formula being in the range of 1.1 to 2.7:

$$d_{10}/d_{90}$$

wherein $d_{10}$ is the average diameter of the particle when the cumulative number thereof is 10% of the total number of said particles, $d_{90}$ is the average diameter of the particle when the cumulative number thereof is 90% of the total number of said particles, and $d_{10}$ and $d_{90}$ are measured under an electron microscope, said cumulative numbers being calculated beginning with the largest particle size, the average refractive index $\bar{n}$ of said film and the refractive index $n_\alpha$ in the thicknesswise direction of said film satisfying the following formulae:

$$1.600 \leq \bar{n} \leq 1.606$$

$$n_\alpha \geq 1.492$$

wherein the average refractive index $\bar{n}$ is an index for crystallization degree of said film, and the refractive index $n_{60}$ in the thicknesswise direction is an index for the degree of facial orientation of said film.

* * * * *